(12) United States Patent
Collins et al.

(10) Patent No.: US 8,314,191 B2
(45) Date of Patent: Nov. 20, 2012

(54) CLASSIFIED CATALYST COMPOSITION, APPARATUS, AND METHOD

(75) Inventors: Raymond M. Collins, Midland, MI (US); Gina R. Gallagher, Broken Arrow, OK (US); Gian C. Gobbi, Midland, MI (US); Donald G. Robinson, Jr., Foster, WV (US)

(73) Assignee: Dow Global Technologies LLC, Midland, MI (US)

( * ) Notice: Subject to any disclaimer, the term of this patent is extended or adjusted under 35 U.S.C. 154(b) by 91 days.

(21) Appl. No.: 13/058,038

(22) PCT Filed: Apr. 30, 2009

(86) PCT No.: PCT/US2009/042244
§ 371 (c)(1),
(2), (4) Date: Feb. 8, 2011

(87) PCT Pub. No.: WO2010/021768
PCT Pub. Date: Feb. 25, 2010

(65) Prior Publication Data
US 2011/0137003 A1 Jun. 9, 2011

Related U.S. Application Data

(60) Provisional application No. 61/090,098, filed on Aug. 19, 2008.

(51) Int. Cl.
*C08F 4/44* (2006.01)
*B01J 31/00* (2006.01)
*B01J 10/00* (2006.01)
*B01J 19/00* (2006.01)

(52) U.S. Cl. ......... 526/160; 502/104; 422/129; 422/131

(58) Field of Classification Search .................. 526/160; 422/129, 131
See application file for complete search history.

(56) References Cited

U.S. PATENT DOCUMENTS

| | | |
|---|---|---|
| 3,437,208 A | 4/1969 | Kaspar et al. |
| 3,477,575 A | 11/1969 | Nemec et al. |
| 3,884,805 A | 5/1975 | Bagdasarian et al. |
| 2,984,358 A | 5/1978 | Johnston |
| 4,108,778 A | 8/1978 | Lambert et al. |
| 4,302,565 A | 11/1981 | Goeke et al. |
| 4,302,566 A | 11/1981 | Karol et al. |
| 4,303,771 A | 12/1981 | Wagner et al. |

(Continued)

FOREIGN PATENT DOCUMENTS
FR 2368996 A1 5/1978
(Continued)

*Primary Examiner* — William Cheung
(74) *Attorney, Agent, or Firm* — Whyte Hirschboeck Dudek SC

(57) ABSTRACT

The present disclosure is directed to an apparatus and process for producing a catalyst composition and a low-fines catalyst composition in particular. A crossflow classification device is used to separate large catalyst particles from catalyst fines. A slurry of a catalyst composition is introduced into the crossflow classification device. A classified catalyst composition is retrieved from a retentate produced as a result of subjecting the catalyst slurry to a crossflow classification process. The solids content of the pre-classified and/or post-classified catalyst slurry is determined by way of NMR spectroscopy. The solids content determination accounts for migration of wash liquid from the catalyst composition and into the slurry liquid phase. The classified catalyst composition has a low-fines content and produces a polyolefin composition with a low polymer fines content.

20 Claims, 11 Drawing Sheets

U.S. PATENT DOCUMENTS

| | | | |
|---|---|---|---|
| 4,442,276 A | 4/1984 | Kashiwa et al. | |
| 4,460,701 A | 7/1984 | Terano et al. | |
| 4,540,679 A | 9/1985 | Arzoumanidis et al. | |
| 4,543,399 A | 9/1985 | Jenkins, III et al. | |
| 4,547,476 A | 10/1985 | Terano et al. | |
| 4,588,790 A | 5/1986 | Jenkins, III et al. | |
| 4,816,433 A | 3/1989 | Terano et al. | |
| 4,829,037 A | 5/1989 | Terano et al. | |
| 4,927,797 A | 5/1990 | Ewen | |
| 4,952,317 A | 8/1990 | Culkin | |
| 4,990,479 A | 2/1991 | Ishimaru et al. | |
| 5,000,848 A | 3/1991 | Hodgins et al. | |
| 5,028,671 A | 7/1991 | Kioka et al. | |
| 5,034,361 A | 7/1991 | Job et al. | |
| 5,066,737 A | 11/1991 | Job | |
| 5,066,738 A | 11/1991 | Ewen | |
| 5,077,357 A | 12/1991 | Job | |
| 5,082,907 A | 1/1992 | Job | |
| 5,106,806 A | 4/1992 | Job | |
| 5,128,029 A | 7/1992 | Herrmann | |
| 5,143,630 A | 9/1992 | Riolchigo | |
| 5,146,028 A | 9/1992 | Job | |
| 5,151,399 A | 9/1992 | Job | |
| 5,153,158 A | 10/1992 | Kioka et al. | |
| 5,229,342 A | 7/1993 | Job | |
| 5,247,032 A | 9/1993 | Kioka et al. | |
| 5,347,031 A | 9/1994 | Koyama et al. | |
| 5,432,244 A | 7/1995 | Rebhan | |
| 5,462,654 A | 10/1995 | Hering, Jr. | |
| 5,472,923 A | 12/1995 | Koskinen et al. | |
| 5,679,249 A | 10/1997 | Fendya et al. | |
| 5,772,900 A | 6/1998 | Yorita et al. | |
| 6,027,656 A | 2/2000 | Henttonen et al. | |
| 6,106,713 A | 8/2000 | Miller et al. | |
| 6,117,322 A | 9/2000 | Miller et al. | |
| 6,395,667 B1 | 5/2002 | Satoh | |
| 6,478,969 B2 | 11/2002 | Brantley et al. | |
| 6,562,117 B2 | 5/2003 | Sano et al. | |
| 6,613,231 B1 | 9/2003 | Jitariouk | |
| 6,635,734 B2 | 10/2003 | Shamshoum et al. | |
| 6,825,146 B2 | 11/2004 | Kilty et al. | |
| 6,855,656 B2 | 2/2005 | Hosaka et al. | |
| 2002/0143124 A1* | 10/2002 | Ogane | 526/160 |
| 2007/0207068 A1 | 9/2007 | Lange et al. | |

FOREIGN PATENT DOCUMENTS

WO 9925463 A1 5/1999

* cited by examiner

CLASSIFIED CATALYST COMPOSITION, APPARATUS, AND METHOD

CROSS-REFERENCE TO RELATED APPLICATION

The present application is the National Phase of PCT Patent Application No. PCT/US2009/042244 filed Apr. 30, 2009, which claims benefit of 61/090,098 filed Aug. 19, 2008. The entire content of which is incorporated by reference herein.

BACKGROUND

The present disclosure relates to methods and apparatuses for forming classified catalyst compositions and further relates to a polyolefin composition produced with the classified catalyst composition.

Polymerization catalysts, such as Ziegler-Natta polymerization catalysts, include a procatalyst in particulate or granular form. These procatalysts often contain some amount of small particles known as fines. The presence of fines is problematic as fines produce small polymer particles during the polymerization process. The small polymer particles cause dusting and plugging of production equipment during polymer production. Catalyst fines further contribute to manufacturing difficulties such as fouling and other problems.

Conventional approaches to fines removal from procatalysts include elutriation, sedimentation, and wet sieving. These approaches, however, have significant drawbacks including high cost, inefficient operation, and the inability to precisely size the catalyst particles. Such drawbacks become worse when the particles are fragile or have mutual attraction. Desirable would be a fines removal process yielding a classified catalyst composition containing a small amount of catalyst fines.

SUMMARY

The present disclosure is directed to an apparatus and process for producing a catalyst composition, and a low-fines catalyst composition in particular. The fines removal of the apparatus and process of the present disclosure provides the ability to significantly reduce the amount of catalyst fines present in a catalyst composition. The present disclosure is also directed to a polyolefin composition having a low polymer fines content, the polyolefin composition produced with the low-fines catalyst composition.

In an embodiment, a process for producing a classified catalyst composition is provided. The process includes introducing a slurry composed of a catalyst composition into a classification device. The classification device is a crossflow classification device. The catalyst composition is composed of catalyst particles, catalyst fines, and optionally catalyst particles with protuberances. The classification device removes catalyst fines from the slurry and forms a retentate. The process further includes recovering from the retentate a classified catalyst composition. The recovered classified catalyst composition has an F10.5 value of less than 1% by weight of the classified catalyst composition.

In an embodiment, the initial catalyst composition has an F10.5 value greater than 1% by weight. The process includes recovering a classified catalyst composition that has an F10.5 value from about 0.1% by weight to less than 1% by weight of the classified catalyst composition.

In an embodiment, the process includes polishing the catalyst particles. The crossflow classification device separates catalyst fines adhered to the catalyst particles by way of attractive forces. Once separated from the catalyst particles, the catalyst fines pass through a filter element of the crossflow classification device along with the permeate. The crossflow classification device also removes protuberances from the catalyst particles. The polishing thereby yields a classified catalyst composition having a larger weight percentage of spherical, or substantially spherical, catalyst particles when compared to the non-classified catalyst composition.

In an embodiment, the crossflow classification device is a crossflow filtration assembly with a crossflow filter device having a crossflow filter element. The process includes moving the catalyst slurry at a tangential velocity from about 0.2 m/second to about 2.0 m/second along the crossflow filter element. Catalyst fines smaller than the crossflow filter element pore size pass through the crossflow filter element as permeate and are separated from the larger catalyst particles. The larger catalyst particles are retained in the retentate and are subsequently recovered. In a further embodiment, the process includes introducing the slurry into the crossflow filter device by passing the slurry through a valveless pump.

In an embodiment, the crossflow classification device is a dynamic filtration device with a dynamic filter element in contact with the slurry to be classified. The process includes moving the dynamic filter element to generate a relative tangential velocity with respect to the slurry of from about 0.1 m/second to about 10.0 m/second. Catalyst fines smaller than the dynamic filter element pore size pass through the dynamic filter element as permeate and are separated from the larger catalyst particles. The larger catalyst particles are retained in the retentate and are subsequently recovered.

In an embodiment, a polymerization process is provided. The polymerization process includes crossflow classifying a slurry of a catalyst composition. Crossflow classification is performed by way of crossflow filtration or dynamic filtration. A retentate containing the larger catalyst particles is retained. The process includes recovering a classified catalyst composition from the retentate and subsequently reacting the classified catalyst composition with an olefin under polymerization conditions to form a polyolefin composition. The polymerization process forms a polyolefin composition having an F250 value from about 0.1% by weight to about 2% by weight.

In an embodiment, the polymerization process includes recovering from the retentate a classified catalyst composition having an F10.5 value less than 1 wt % of the classified catalyst composition. The classified catalyst composition may be combined with a cocatalyst and/or a selectivity control agent, and combinations thereof, prior to or during introduction into a polymerization reactor.

In an embodiment, an apparatus is provided for classifying the catalyst composition and forming a polyolefin. The apparatus includes a crossflow classification device adapted to receive the slurry of the catalyst composition and retain the classified catalyst composition. The crossflow classification device may be a crossflow filtration device or a dynamic filtration device. The apparatus also includes a polymerization reactor. The polymerization reactor is adapted to receive the classified catalyst composition and an olefin and also provides polymerization conditions sufficient to form a polyolefin composition. The polymerization reactor may be a fluidized bed (gas phase) polymerization reactor. The apparatus may also include a source for the slurry.

In an embodiment, a catalyst composition is provided. The catalyst composition includes a plurality of classified catalyst composition particles with an F10.5 value less than 1 wt % of the classified catalyst composition. The classified catalyst composition forms a polyolefin composition with an F250 value from about 0.1% by weight to about 2% by weight when the classified catalyst composition is contacted with an olefin under polymerization conditions.

In an embodiment, a method for determining solids content in a catalyst slurry is provided. The method includes preparing a migration correction factor for a catalyst composition. The migration correction factor is a numeric value that corrects for the phenomenon of wash liquid migrating from the solid catalyst composition and into the slurry liquid phase when the catalyst slurry is formed. A liquid weight percent value for the catalyst slurry containing the catalyst composition is determined by way of NMR spectroscopy. The method includes calculating a solids weight percent value for the catalyst slurry from the liquid weight percent value and the migration correction factor.

An NMR analyzer generates an NMR response signal for the hydrogen present in the liquid phase of the catalyst slurry. In an embodiment, the NMR analyzer is calibrated before generating the NMR response signal.

Preparation of the migration correction factor includes forming a standard catalyst slurry with a known solids weight percent value for the catalyst composition and determining a measured solids weight percent value for the standard catalyst slurry. The measured solids weight percent value is generated by the NMR analyzer. The method includes dividing the known solids weight percent value by the measured solids weight percent value yielding the migration correction factor.

In an embodiment, preparation of the migration correction factor includes determining a wash liquid weight percent value for the catalyst composition. The wash liquid weight percent value is subtracted from the known solids weight percent value.

In an embodiment, the method includes providing a plurality of samples of the catalyst slurry and determining the liquid weight percent value for each sample by individually placing each sample in the NMR analyzer. The method further includes calculating from each sample a respective liquid weight percent value. Each liquid weight percent value is individually multiplied by the migration correction value providing a plurality of solids weight percent values for the catalyst slurry. The standard deviation for the plurality of solids weight percent values is less than about 0.4%.

The present disclosure provides a process for producing a catalyst composition. In an embodiment, a process for producing the catalyst composition is provided which includes producing a plurality of individual batches of a catalyst composition. A variance value is calculated for the data set of the plurality of batches based on a measured catalyst composition property for each batch. The process includes mixing the plurality of individual batches together and forming a master batch. The master batch is divided into a plurality of master sub-batches. The process includes reducing the variance value in the plurality of master sub-batches.

In an embodiment, a mixing device is provided. The mixing device includes a chamber rotatable along an axis of rotation. A first annular member extends along the axis of rotation and has an interior end located in an interior of the chamber. A second annular member is present in the chamber interior and is substantially perpendicular to the first annular member. A rotatable annular joint member operatively connects the interior end of the first annular member and the second annular member, the rotatable annular joint permitting rotation of the second annular member with respect to the first annular member.

In an embodiment, the mixing device permits sub-surface filling/discharge of the catalyst composition (or catalyst slurry), or batches of catalyst composition into/from the chamber.

An advantage of the present disclosure is the provision of an improved catalyst composition for the polymerization of olefins.

An advantage of the present disclosure is the provision of a catalyst classification process which does not damage the catalyst particles.

An advantage of the present disclosure is the provision of a classified catalyst composition with a low content of catalyst fines.

An advantage of the present disclosure is the provision of an improved olefin polymerization process.

An advantage of the present disclosure is the provision of an olefin polymerization process which produces a polyolefin with a low content of polymer fines.

An advantage of the present disclosure is the production of a classified catalyst composition having an increased amount of spherical, or substantially spherical catalyst particles compared to the non-classified catalyst composition.

An advantage of the present disclosure is the ability to accurately provide catalyst composition particles of a desired size.

An advantage of the present disclosure is an improved method to determine the solids content of a catalyst slurry.

An advantage of the present disclosure is a method for determining the solids content of a catalyst slurry that accounts for the migration of wash liquid from the catalyst composition and into the liquid phase of the slurry.

DETAILED DESCRIPTION

Figure 1:
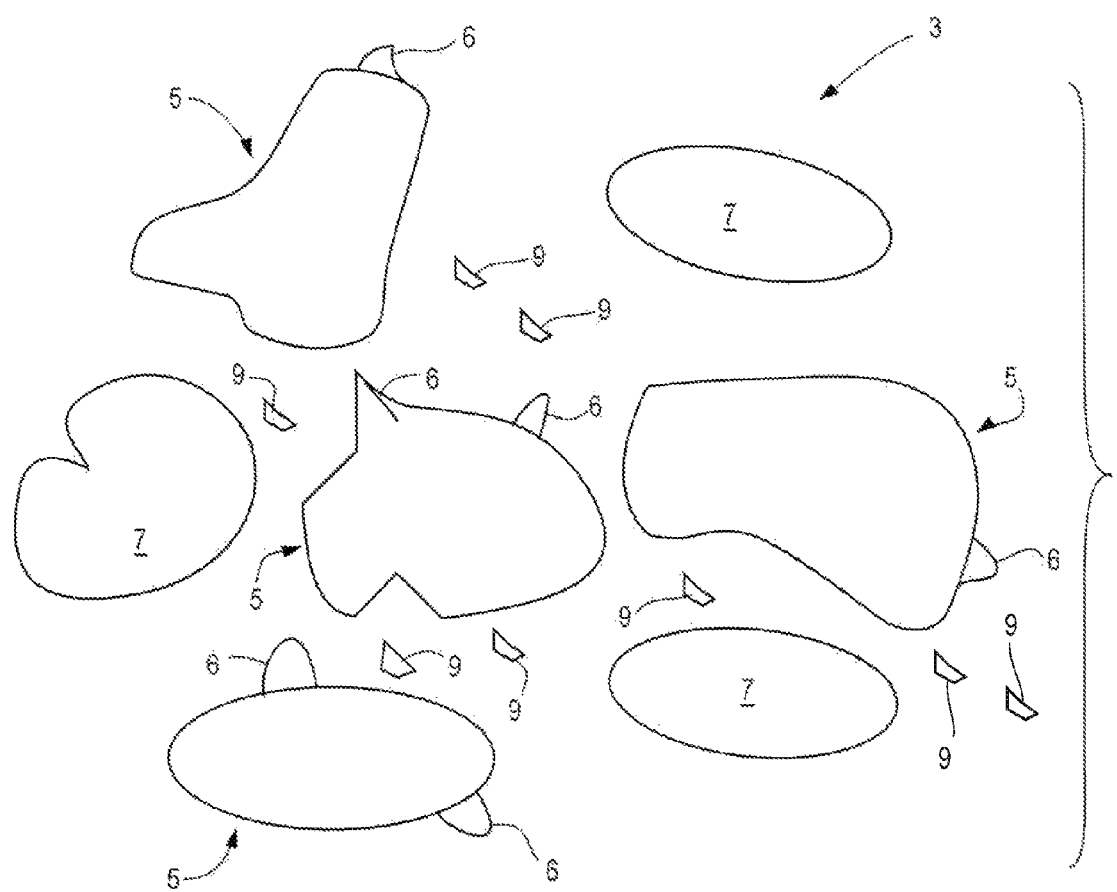
FIG. 1 is a schematic representation of a catalyst composition in accordance with an embodiment of the present disclosure.

Any numerical range recited herein, includes all values from the lower value and the upper value, in increments of one unit, provided that there is a separation of at least two units between any lower value and any higher value. As an example, if it is stated that a compositional, physical or other property, such as, for example, molecular weight, melt index, etc., is from 100 to 1,000, it is intended that all individual values, such as 100, 101, 102, etc., and sub ranges, such as 100 to 144, 155 to 170, 197 to 200, etc., are expressly enumerated in this specification. For ranges containing values which are less than one, or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this application. In other words, any numerical range recited herein includes any value or subrange within the stated range. Numerical ranges have been recited, as discussed herein, in reference to density, weight percent of component, tan delta, molecular weights and other properties Unless stated to the contrary, implicit from the context, or customary in the art, all parts and percents are based on weight and all test methods are current as of the filing date hereof. For purposes of United States patent practice, the contents of any patent, patent application or publication referenced herein are hereby incorporated by reference in their entirety herein, especially with respect to the disclosure of structures, synthetic techniques and general knowledge in the art. The term "comprising" when used herein with respect to a composition or mixture is not intended to exclude the additional presence of any other compound or component. The term "aromatic" or "aryl" refers to a polyatomic, cyclic, ring system containing $(4\delta+2)\pi$ electrons, wherein $\delta$ is an integer greater than or equal to 1.

The term "composition," as used herein, includes a mixture of materials which comprise the composition, as well as reaction products and decomposition products formed from the materials of the composition.

The term "polymer," as used herein, refers to a polymeric compound prepared by polymerizing monomers, whether of the same or a different type. The generic term polymer thus embraces the term homopolymer, usually employed to refer to polymers prepared from only one type of monomer, copolymer (two or more monomers), and the term interpolymer (three or more monomers) as defined hereinafter.

In an embodiment, a process for producing a catalyst composition is provided. The process includes introducing a slurry of a catalyst composition into a crossflow classification device. The catalyst composition includes catalyst particles and catalyst fines. The crossflow classification device removes the catalyst fines from the slurry and forms a retentate. A classified catalyst composition is recovered from the retentate. The classified catalyst composition has an F10.5 value less than 1% by weight based on the weight of the classified catalyst composition.

As used herein, the "slurry" is a solid-in-liquid suspension of catalyst composition particles dispersed in a liquid. The catalyst composition particles are catalyst particles, catalyst fines, optionally catalyst particles with protuberances (PWP), and combinations thereof. The liquid may be water, alcohol, ether, a hydrocarbon, a chlorinated hydrocarbon, an oil, or any combination of the foregoing.

As used herein, "a catalyst composition" is a composition that forms a polyolefin when contacted with a polyolefin under polymerization conditions. The catalyst composition may optionally include a cocatalyst, an internal electron donor, an external electron donor, a selectivity control agent, an activity limiting agent, and any combination thereof. Nonlimiting examples of suitable catalyst compositions include Ziegler-Natta catalyst compositions, constrained geometry catalyst compositions, and metallocene catalyst compositions.

In an embodiment, the catalyst composition is a Ziegler-Natta catalyst composition. As used herein, a "Ziegler-Natta catalyst composition" is a combination of (1) a transition metal compound of an element for Periodic table groups IV to VIII (procatalyst) and (2) an organometallic compound of a metal from Periodic Table groups I to III (cocatalyst). Nonlimiting examples of suitable Ziegler-Natta procatalysts include halides or oxyhalides of titanium, vanadium, chromium, molybdenum, and zirconium. Nonlimiting examples of Ziegler-Natta cocatalysts include hydrides, alkyls, or aryls of aluminum, lithium, zinc, tin, cadmium, beryllium, and magnesium.

In an embodiment, a procatalyst precursor, which includes magnesium moieties, may be employed to form the procatalyst composition. Sources for such magnesium moieties include anhydrous magnesium chloride, magnesium alkoxides or aryloxides, mixed magnesium alkoxy halides, or carbonated magnesium dialkoxides or aryloxides. Nonlimiting examples of sources of magnesium moieties are magnesium di ($C_{1-4}$)alkoxides, especially diethoxymagnesium. Additionally the precursors may include titanium moieties. Suitable sources include titanium alkoxides, titanium aryloxides, titanium alkoxy halides, and titanium halides. Precursors may include one or more magnesium di ($C_{1-4}$)-alkoxides and one or more titanium tetra-($C_{1-4}$)alkoxides.

Various methods of making procatalyst precursor are known in the art. These methods are described, inter alia, in U.S. Pat. Nos. 6,825,146; 5,034,361; 5,082,907; 5,151,399; 5,229,342; 5,106,806; 5,146,028; 5,066,737; 5,077,357; 4,442,276; 4,540,679; 4,547,476; 4,460,701; 4,816,433; 4,829,037; 4,927,797; 4,990,479; 5,066,738; 5,028,671; 5,153,158; 5,247,031; 5,247,032, and elsewhere. In particular, the preparation involves halogenation of the foregoing mixed magnesium and titanium alkoxides, and may involve the use of one or more compounds, referred to as "clipping agents", that aid in forming specific, low molecular weight, compositions of the desired morphology. Examples of suitable clipping agents include trialkylborates, especially triethylborate, phenolic compounds, especially cresol, and silanes.

In an embodiment, the procatalyst precursor is a mixed magnesium/titanium compound (MagTi) of the formula $Mg_d Ti(OR^e)_f X_g$ wherein $R^e$ is an aliphatic or aromatic hydrocarbon radical having 1 to 14 carbon atoms or $COR'$ wherein $R'$ is an aliphatic or aromatic hydrocarbon radical having 1 to 14 carbon atoms; each $OR^e$ group is the same or different; X is independently chlorine, bromine or iodine, preferably chlorine; d is 0.5 to 56, or 2 to 4; f is 2 to 116 or 5-15; and g is 0.5 to 116, or 1 to 3. The precursors are prepared by controlled precipitation through removal of an alcohol from the reaction mixture used in their preparation. In an embodiment, a reaction medium comprises a mixture of an aromatic liquid, especially a chlorinated aromatic compound, most especially chlorobenzene, with an alkanol, especially ethanol. Suitable halogenating agents include titanium tetrabromide, titanium tetrachloride or titanium trichloride, especially titanium tetrachloride. Removal of the alkanol from the solution used in the halogenation, results in precipitation of the solid precursor, having especially desirable morphology and surface area. Moreover, the resulting precursors are particularly uniform in particle size.

The precursor is converted to a solid procatalyst by further reaction (halogenation) with a halogenating agent (step C) and incorporation of an internal electron donor. Suitable halogenating agents are titanium halides having the formula Ti(OR$^e$)$_f$X$_h$ wherein R$^e$ and X are defined as above, f is an integer from 0 to 4; h is an integer from 0 to 4; and e+h is 3 or 4. In an embodiment, the halogenation agent is TiCl$_4$. In an embodiment, the halogenation is conducted in the presence of a chlorinated or non-chlorinated aromatic liquid, such as dichlorobenzene, o-chlorotoluene, chlorobenzene, benzene, toluene, or xylene. In an embodiment, the halogenation is conducted by use of a mixture of halogenating agent and chlorinated aromatic liquid comprising from 40 to 60 volume percent halogenating agent, such as TiCl$_4$.

During (step C) the reaction mixture may be heated, if desired. In an embodiment, the precursor and halogenating agent are contacted initially at a temperature from 0° C. to 60° C., or from 20° C. to 30° C., and heating is commenced at a rate of 0.1 to 10.0° C./minute, or at a rate of 1.0 to 5.0° C./minute. The internal electron donor may be added later, after an initial contact period between the halogenating agent and precursor. Temperatures for the halogenation are from 60° C. to 150° C. (or any value or subrange therebetween), or from 90° C. to 120° C. Halogenation may be continued in the substantial absence of the electron donor for a period from 5 to 60 minutes, or from 10 to 50 minutes.

The internal electron donor may be a carboxylic acid ester (such as ethyl benzoate), a diether, a succinate, a dialkoxybenzene, or a diol ester. In an embodiment, the internal electron donor is a carboxylic acid ester such as $C_{1-10}$ alkyl diesters of aromatic dicarboxylic acids, particularly $C_{1-4}$ alkyl diesters of phthalic acid or terephthalic acid. Nonlimiting examples of suitable carboxylic acid esters include diethylphthalate, diisopropylphthalate, diisobutylphthalate, diisopropylterephthalate, and diisobutylterephthalate. Mixtures of the foregoing compounds may be employed, if desired. In an embodiment, the internal electron donor is di(isobutyl)phthalate. Sufficient internal electron donor usually is provided so that the molar ratio of internal electron donor to the magnesium present in the solid procatalyst precursor at this stage of the preparation is from about 0.01:1 to about 1:1, or from about 0.05:1 to about 0.5:1, or from about 0.03:1 to about 0.1:1.

The manner in which the procatalyst precursor, halogenating agent and internal electron donor are contacted may be varied. In an embodiment, the procatalyst precursor is first contacted with a mixture containing the halogenating agent and a chlorinated aromatic compound. The resulting mixture is stirred and may be heated if desired. Next, the internal electron donor is added to the same reaction mixture without isolating or recovering of the precursor. The foregoing process may be conducted in a single reactor with addition of the various ingredients controlled by automated process control.

Contact times of the precursor with the internal electron donor are at least 10 minutes, or at least 15 minutes, or at least 20 minutes, or at least 1 hour at a temperature from at least 25° C., or at least 50° C., or at least 60° C. up to a temperature of 150° C., or up to 1.20° C., or up to 115° C., or up to 110° C.

The resulting precursor is then recovered and contacted one or more times (step D) in the absence (or in the presence) of the same (or different) internal electron donor with a mixture of the halogenating agent in the chlorinated aromatic compound for at least 10 minutes, or at least 15 minutes, or at least 20 minutes, and up to 1 hour, or up to 45 minutes, or up to 30 minutes, at a temperature from at least 25° C., or at least 50° C., or at least 60° C., to a temperature up to 150° C., or up to 120° C., or up to 115° C.

After the foregoing halogenation procedure, the resulting solid procatalyst composition is separated from the reaction medium employed in the final process, by filtering for example, to produce a moist filter cake. The moist filter cake may then be rinsed or washed with a liquid diluent to remove unreacted TiCl$_4$ and may be dried to remove residual liquid, if desired. Typically the solid, exchanged procatalyst composition is washed one or more times with a "wash liquid," which is a liquid hydrocarbon such as an aliphatic hydrocarbon such as isopentane, isooctane, isohexane, hexane, pentane, or octane. The solid, exchanged procatalyst composition then can be separated and dried or slurried in a hydrocarbon, especially a relatively heavy hydrocarbon such as mineral oil for further storage or use.

The resulting solid procatalyst composition is in the form of porous particles having a titanium content of from about 0.1 percent by weight to about 6.0 percent by weight, based on the total solids weight, or from about 1.0 percent by weight to about 4.5 percent by weight, or from about 1.5 percent by weight to about 3.5 percent by weight. The weight ratio of titanium to magnesium in the solid, exchanged, procatalyst composition is suitably between about 1:3 and about 1:160, or between about 1:4 and about 1:20, or between about 1:6 and 1:13. The internal electron donor may be present in the procatalyst composition in a molar ratio of internal electron donor to magnesium of from about 0.005:1 to about 1:1, or from about 0.04:1 to about 0.4:1.

In an embodiment, the procatalysts herein are mixed magnesium/titanium compounds of the formula, $Mg_dTi(OR^e)_fX_g(ED)_h$, wherein $R^e$ is an aliphatic or aromatic hydrocarbon radical having 1 to 14 carbon atoms or COR' wherein R' is an aliphatic or aromatic hydrocarbon radical having 1 to 14 carbon atoms; each $OR^e$ group is the same or different; X is independently chlorine, bromine or iodine; ED is an internal electron donor, such as diisobutylphthalate; d is 0.5 to 56; f is 0 to 2, or 0 to 0.5, or 0.01 to 0.3; g is 3 to 116; and h is 0.005 to 1.5.

The procatalyst composition may be further treated by one or more of the following procedures prior to or after isolation of the solid procatalyst. The solid procatalyst composition may be contacted (halogenated) with a further quantity of titanium halide compound, if desired; it may be exchanged under metathesis conditions with an acid chloride, such as phthaloyl dichloride or benzoylchloride, and it may be rinsed or washed, heat treated; or aged. The foregoing additional procedures may be combined in any order or employed separately, or not at all.

Not wishing to be bound by any particular theory, it is believed that further halogenation by contacting the previously formed procatalyst composition with a titanium halide compound, especially a solution thereof in a halohydrocarbon diluent, results in desirable modification of the procatalyst composition, possibly by removal of certain inactive metal compounds that are soluble in the foregoing diluent. Accordingly, in an embodiment, the procatalyst is contacted with a halogenating agent, such as a mixture of a titanium halide and a halohydrocarbon diluent, such as TiCl$_4$ and chlorobenzene, one or more times prior to isolation or recovery.

The catalyst composition has a particle size distribution D50 from about 10 µm to about 60 µm. As used herein "D50"

is the particle distribution such that 50% of the sample particle volume is above the stated particle size range.

The catalyst composition is a plurality of particles, the particles having various sizes. As shown in FIG. 1, the catalyst composition 3 includes a plurality of particles: catalyst particles with protuberances (PWP) 5, catalyst particles 7, and catalyst fines 9. As used herein, a "catalyst fine" is a particle having a maximum diameter of 10.5 µm or less as measured on an Accusizer particle sizing instrument available from Particle Sizing Systems, Santa Barbara, Calif. The Accusizer instrument uses light obscuration to count and size particles one at a time in the size range from about 0.5 µm to about 2500 µm. A given sample is automatically diluted until the Accusizer "sees" one particle at a time within the sample. As used herein, "maximum diameter" is the greatest direct distance between two points on the surface of a particle. In an embodiment, the PWPs 5 and the particles 7 have a maximum diameter from about 10 µm to about 100 µm, or from about 20 µm to about 90 µm. The PWPs 5 have one or more protuberances 6. Not wishing to be bound by any particular theory, it is believed that a source of fines is the attrition of the protuberances 6 from the PWPs 5. In other words, physical forces upon the PWPs 5 during processing and/or polymerization result in the protuberances 6 breaking from the PWPs 5. Once detached from a PWP, a protuberance 6 may become a fine 9. Other causes of catalyst fines include catalyst handling and stresses resulting from polymerization.

The present process for producing the catalyst composition includes introducing the slurry of catalyst composition particles into a classification device. In an embodiment, the slurry is the suspension formed during one or more of the rinse operations used to recover the procatalyst (in Step E) or a suspension formed subsequent to recovery of the solid procatalyst as a solid particulated product.

In an embodiment, the slurry includes from about 10 weight % to about 40 weight % of catalyst composition, or from about 20 weight % to about 35 weight %, or about 25% by weight catalyst composition particles suspended in mineral oil. In a further embodiment, a desired size range for the catalyst composition particles is selected and the slurry is subjected to two filtration operations, using two different sized filtration mediums, to remove particles with a size outside of the desired size range.

The slurry is introduced into a crossflow classification device. As used herein, "a crossflow classification device" is a device which imparts relative tangential motion between (1) solid particles suspended in a liquid and (2) a porous solid filter medium in contact with the same liquid. A crossflow classification device separates the particles into two or more classes, each class containing a specific range of particle size. Correspondingly, "crossflow classification," "crossflow classifying," or "classifying by crossflow" is the process of separating particles in a solid-in-liquid suspension into two or more classes of a particular particle size range by imparting relative tangential motion between the catalyst suspension and a porous filter medium and moving one class of particle size through that filter medium and away from the original suspension. Accordingly, "a classified catalyst composition" is a catalyst composition that has been subjected to a classification process, such as crossflow classification, and therefore contains a majority of particles within a specific particle size range.

Figure 2:
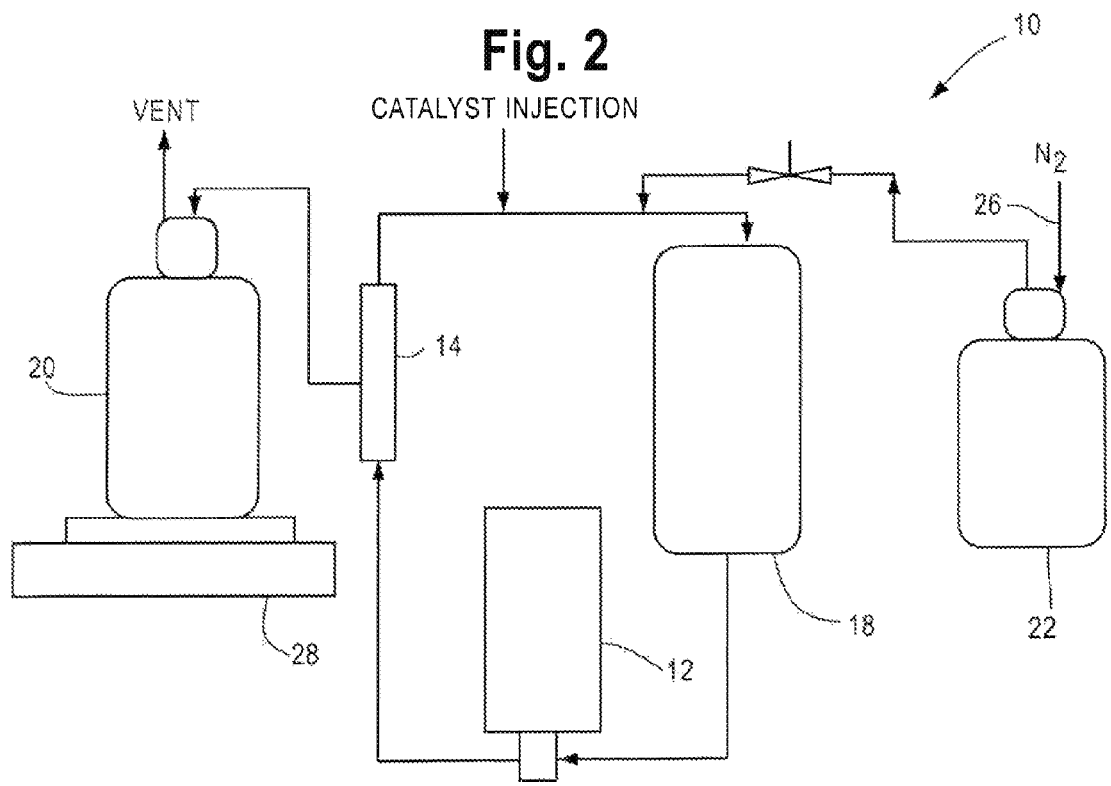
FIG. 2 is a schematic representation of a crossflow filtration assembly in accordance with an embodiment of the present disclosure.

The crossflow classification device is a crossflow filtration device or a dynamic filtration device. In an embodiment, the crossflow classification device is a crossflow filtration assembly 10 as shown in FIG. 2. The process for producing the low-fines catalyst composition correspondingly includes subjecting the slurry to crossflow filtration. "Crossflow filtration" or "crossflow filtering" is a separation process in which the suspension flows parallel to, or substantially parallel to, the porous surface of a filter element. In crossflow filtration, the slurry moves tangentially across or along the filter element. Particles present in the slurry that are smaller than the pore size of the crossflow filter element pass through the filter element with liquid as permeate. Everything that does not pass through the crossflow filter element is retentate. The tangential motion of the slurry across the crossflow filter element causes particles trapped in/on the filter element to be moved along or off the filter element and away from the filter element pores. Thus, crossflow filtration prevents blockage of the crossflow filter element pores by the particles in the slurry. By avoiding obstruction of the filter element pores with particles, crossflow filtration promotes accurate and precise classification of particles. In an embodiment, crossflow classification is achieved by crossflow filter elements with well-defined flow passages of simple geometry and limited depth and no, or substantially no, tortuosity.

Figure 3:
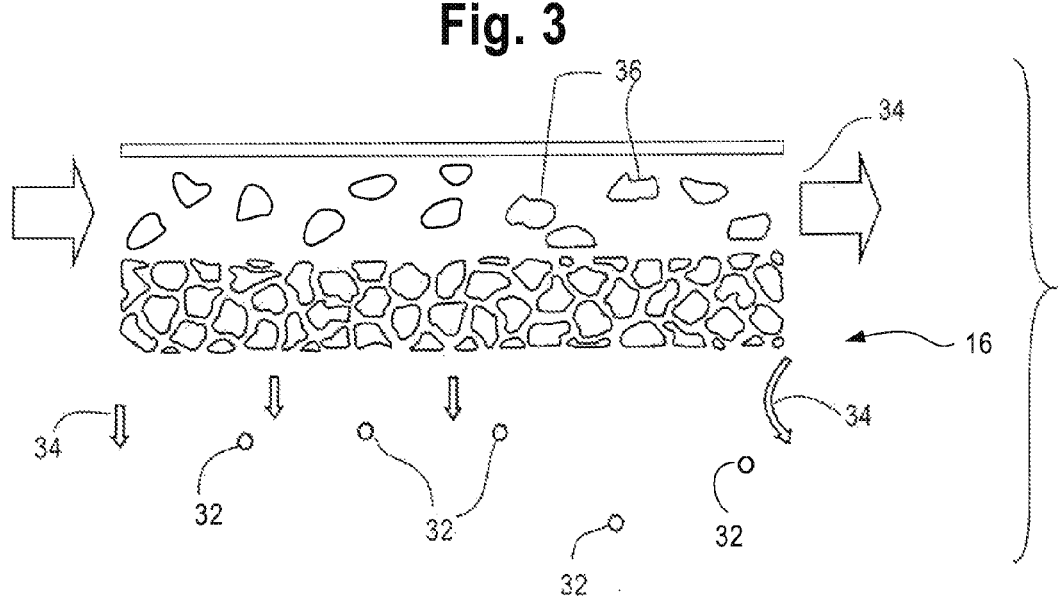
FIG. 3 is a sectional view of a crossflow filter element in accordance with an embodiment of the present disclosure.

A pump 12 receives the slurry from a slurry source 18 as shown in FIG. 2. The pump 12 introduces the slurry into a crossflow filter device 14 and moves the slurry tangentially with respect to a crossflow filter element 16 such that the slurry flows along, or parallel to, or substantially parallel to, the crossflow filter element 16 (FIG. 3). As shown in FIG. 3, catalyst fines 32 and liquid 34 which pass through the crossflow filter element 16 are collected in a permeate reservoir 20 (FIG. 2). The catalyst particles 36 and liquid 34 which do not pass through the crossflow filter element 16 form the retentate. In an embodiment, the retentate is circulated through the slurry source 18, the pump 12, and the crossflow filter device 14 one or more times as desired.

In an embodiment, the removal of permeate through the crossflow filter element is controlled at a superficial velocity or flux (volumetric flow per unit area) as desired. The superficial velocity of the process slurry through the crossflow filter element is from about 0.0002 m/second to about 0.002 m/second. In a further embodiment, the fines can be removed from or otherwise separated from the permeate. Nonlimiting separation techniques include filtration, evaporation, decantation and combinations thereof. This advantageously enables the suspending liquid to be recycled and reused in the crossflow classification process.

In an embodiment, the process includes diluting the slurry with a diluent to form a process slurry. As used herein, a "process slurry" is particles of the catalyst composition suspended in a suspending liquid. The "suspending liquid" is a mixture of mineral oil (mineral oil from the catalyst/mineral oil slurry) and the diluent. A diluent from diluent source 22 may be mixed with the catalyst slurry to form the process slurry. The process slurry is introduced into the crossflow filter device 14. Nonlimiting examples of liquids suitable for the diluent include liquid hydrocarbons such as liquid aliphatic hydrocarbons and liquid aromatic hydrocarbons. In an embodiment, the diluent is pentane, isopentane, octane, isooctane, and/or toluene. The diluent promotes fluid flow through the crossflow filter assembly 10 and also prevents clogging of the crossflow filter element 16. The crossflow filtration may be performed in an inert environment and/or under an inert gas blanket such nitrogen or a noble gas. In an embodiment, the crossflow filtration is performed under a nitrogen blanket 26. A weighing device 28, such as a scale, may be used to determine the amount of permeate retrieved from the crossflow filtration.

In an embodiment, the crossflow filter element 16 has a pore size from about 10 µm to about 100 µm, or from about 20

μm to about 80 μm, or about 40 μm. It is understood that selection of the pore size may affect the size of the catalyst fines capable of passing through the crossflow filter element 16. In an embodiment, the crossflow filter element 16 is a Fujiloy crossflow filter element with a 40 μm pore opening, available from the Fuji Filter Mfg. Co., Ltd.

In an embodiment, the pump 12 is selected such that the pump does not cause attrition of the PWPs 5 and/or the catalyst particles 7 present in the catalyst composition. It has been surprisingly discovered that valveless pumps do not cause attrition of the catalyst composition. Nonlimiting examples of valveless pumps include valveless piston pumps, positive displacement pumps, and/or valveless metering pumps. Correspondingly, an embodiment of the present process includes passing the slurry through a valveless pump and avoiding or otherwise preventing attrition of the catalyst composition during the classification during the crossflow filtration).

In an embodiment, the process includes selecting a tangential velocity for the slurry that avoids attrition of the catalyst composition. It has been found that pumping the slurry along the crossflow filter element 16 at a tangential velocity from about 0.2 m/second to about 2.0 m/second, or from about 0.4 m/second to about 0.8 m/second does not cause attrition of the catalyst composition and promotes efficient classification. In a further embodiment, the pressure imparted upon the catalyst composition by the pump 12 may be selected to avoid attrition while simultaneously providing sufficient pressure to force the catalyst fines 9 to pass through the filter element 16. In a yet a further embodiment, the pressure inside the slurry source 18 is elevated to drive permeate through the filter element 16 at a desired flux. In this way, the pump 12 does not have to impart pressure upon the suspension. Rather, the pump 12 simply moves the suspension past the filter element 16 at the specified velocity. This further reduces catalyst attrition.

The present process includes recovering, from the retentate, a classified catalyst composition. Recovery of the classified catalyst composition from the retentate may be accomplished by way of filtration and/or vacuum filtration. The recovered classified catalyst composition may be washed and dried as necessary as is known in the art.

In an embodiment, the classified catalyst composition has an F10.5 value of less than 1 weight %, or from 0 weight % to less than 1% by weight, or from about 0.1 weight % to less than about 1 weight %. As used herein, "an F10.5 value" is the weight percent of the particles of the catalyst composition particles having a volume average particle size of 10.5 μm or less based on the weight of the classified catalyst composition. The F10.5 value is determined with an Accusizer particle sizing instrument available from Particle Sizing Systems, Santa Barbara, Calif. In a further embodiment, the initial or pre-classified catalyst composition has an F10.5 value greater than 1 weight % and the process includes recovering a classified catalyst composition having an F10.5 value less than 1 weight %, or from about 0.1 weight % to less than 1 weight %. Thus, a "low-fines catalyst composition" has an F10.5 value that is less than 1 weight %.

Figure 4:
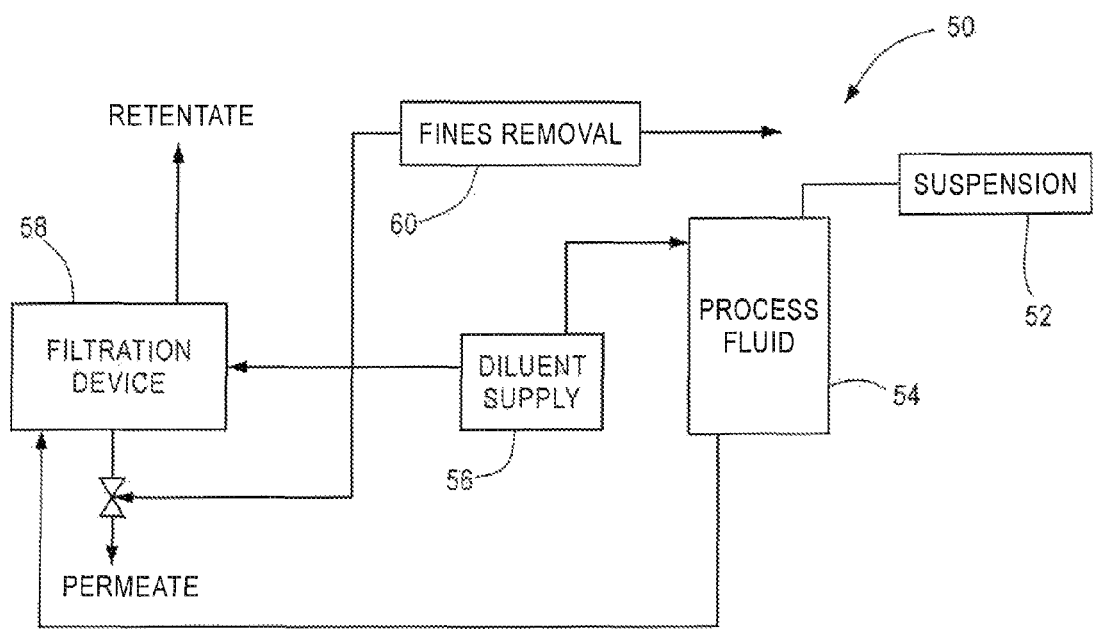
FIG. 4 is a schematic representation of a dynamic filtration system in accordance with an embodiment of the present disclosure.

In an embodiment, the crossflow classification, device is a dynamic filtration device as used in a dynamic filtration system 50, as shown in FIG. 4. As used herein, "dynamic filtration" is a separation process whereby a filter element in contact with a slurry rotates, oscillates, or reciprocates causing relative tangential flow of the slurry with respect to the filter element. Solid particles are uniformly suspended, or substantially uniformly suspended, in the liquid through the motion of the filter element and/or additional immersed impellers. In an embodiment, the slurry is a process slurry. The ratio of mineral oil to diluent is sufficient to achieve an effective viscosity and solids concentration.

In an embodiment, pressure is applied to the process slurry, for example, using a compressed gas, to achieve a pressure gradient across the dynamic filter element. The pressure gradient produces a superficial velocity or flux of permeate through the dynamic filter element and drives the flow of the process slurry through the openings of the dynamic filter element thereby transporting suspended particles smaller than the size of the dynamic filter element openings through the dynamic filter element as permeate. Everything that does not pass through the filter element is retentate. Momentum transferred from the moving filter element induces convective flow of the adjacent slurry and mixing of the particles suspended in the retentate. Everything that does not pass through the filter element is retentate. Momentum transferred from the moving filter element induces convective flow of the adjacent slurry and mixing of the particles suspended in the retentate.

In an embodiment, the mixing of particles suspended in the retentate may be augmented by additional moving impellers in contact with the slurry. Augmented mixing maintains the mobility of particles in suspension and continually renews access by particles to the openings of the dynamic filter element, especially those particles smaller than the openings (fines). The motion of the dynamic filter element prevents obstruction of its openings by incident particles, thereby maintaining the size and shape of those openings and the size classification achieved. Notwithstanding the removal of fines, the mass concentration of solids present in the retentate is substantially constant. The mass concentration of solids is controlled by the addition of solids-free liquid as permeate containing fines is removed.

FIG. 4 is a schematic illustration of a dynamic filtration system 50. The dynamic filtration system 50 includes a source 52 of the slurry (or suspension). The slurry is supplied to a slurry supply vessel 54, where a suitable process slurry is prepared by addition of a diluent from diluent supply 56 (i.e., the slurry of the catalyst composition and optionally a diluent). The diluent may be any diluent as previously disclosed herein. A dynamic filtration device 58 is supplied with the process shiny and the diluent from the diluent supply 56. In the dynamic filtration device 58, the process stream is separated into a permeate stream and a retentate stream. The permeate stream is composed of suspending liquid containing small particles and/or fines. The retentate stream includes process slurry and solid particles of the desired size range. The permeate stream may be sent to a fines removal unit 60, for reclamation of diluent and/or recovery of fine particles.

Figure 5:
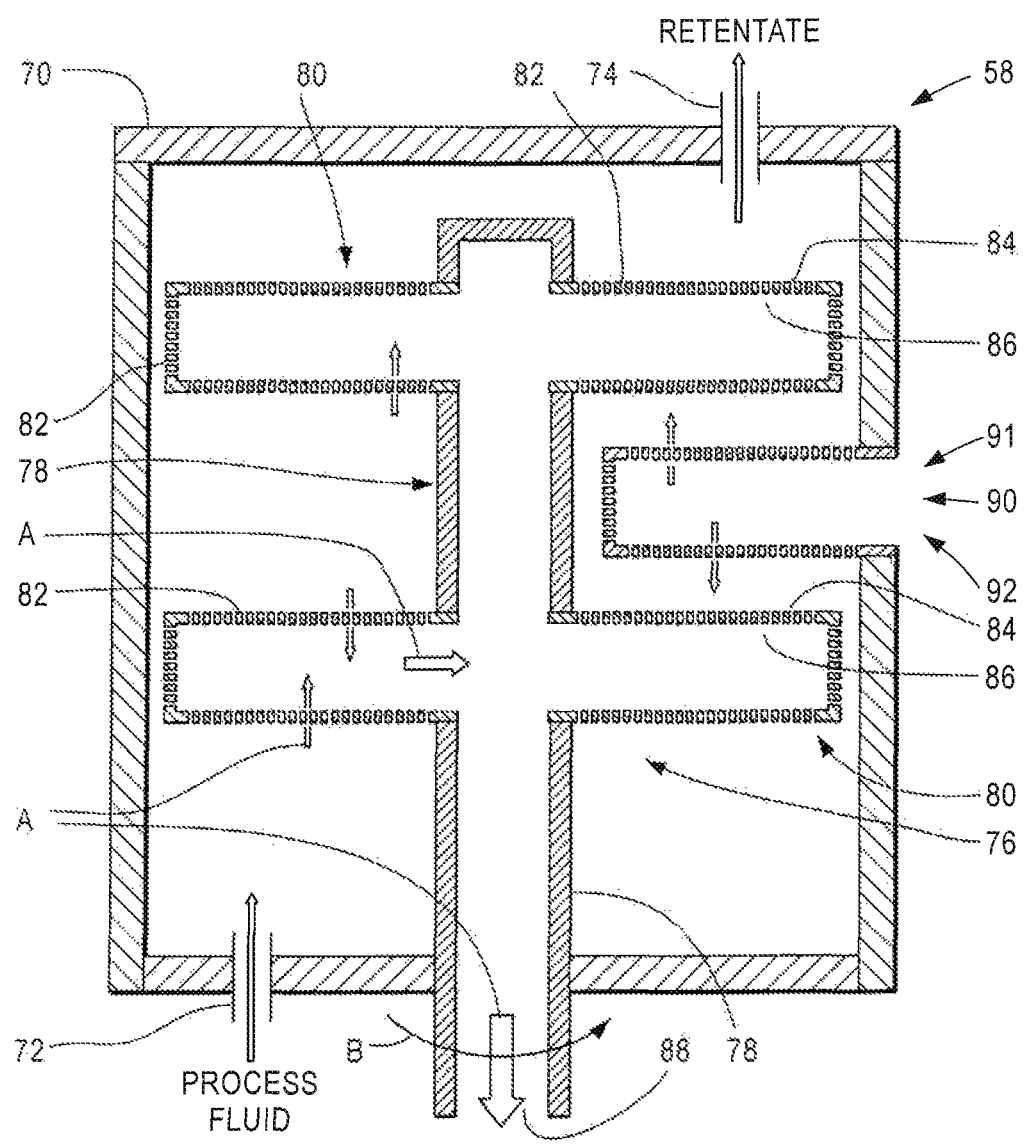
FIG. 5 is a sectional view of a dynamic filtration device in accordance with an embodiment of the present disclosure.

FIG. 5 illustrates an embodiment of the dynamic filtration device 58. The dynamic filtration device 58 includes a housing 70 having a slurry entry port 72 and a retentate discharge port 74. A movable filter assembly is located in the housing 70. Nonlimiting examples of suitable movable filter assemblies include a rotating dynamic filter element, an oscillating dynamic filter element, a reciprocating dynamic filter element, and any combination of the foregoing.

In an embodiment, the dynamic filtration device 58 includes a rotatable filter assembly 76. The rotatable filter assembly 76 has a central hollow rotating support 78 and one or more hollow filter assemblies 80. Each hollow filter assembly 80 has a dynamic filter element 82 (i.e., a rotatable dynamic filter element) with an exterior surface 84 and an interior surface 86. The interior surface 86 provides structural support to the exterior surface 84 and facilitates drainage of permeate containing fines. The dynamic filter element 82 may have any desired pore size and shape. In an embodiment, the filter element 82 has well-defined flow passages (i.e., pores) of simple geometry and limited depth with little or no tortuosity. The dynamic filter element 82 may be made of any micro or macro porous material such as ceramic, metal, and/or polymeric material. The central hollow rotating support 78 provides fluid communication between the interior of each hollow filter assembly 80 and a permeate discharge outlet 88.

The motion of the rotating filter assembly 76 (as indicated by arrow B) prevents incident particles from obstructing or altering the openings of the exterior surface of the filter element 84 and produces a dynamic crossflow effect. Such motion also imparts momentum to the surrounding suspension, promoting convective flow and mixing to distribute fines uniformly to continuously renew their access to the exterior surface 84 of the filter element. Fluid pressure imposed on the process slurry inside housing 70 generates a pressure gradient across the depth of each dynamic filter element 82. This pressure gradient constitutes a mechanical force which drives process slurry through the moving filter elements 82. Any slurry particles smaller than the pore size of the dynamic filter element are transported by suspending liquid through the exterior surface 84 and then through the interior surface 86 and into the hollow interior of the filter assemblies 80 as indicated by arrows A of FIG. 5. Particles and suspending liquid that pass into the hollow interior of the hollow filter assemblies 80 become permeate and are separated from the original suspension. Specifically, catalyst fines smaller than the pore size pass through the dynamic filter element 82 with the suspending liquid. The permeate suspension of fines is discharged through permeate discharge outlet 88. Slurry particles larger than the pores of the dynamic filter element 82 remain on the exterior side of the dynamic filter element 82. The motion of the rotating filter assembly 76 maintains the retentate particles in a suspended, mobile state and prevents accumulation of particles on the exterior surface 84 of the dynamic filter elements 82. Make-up diluent from a diluent supply 90 may be added into the interior of the housing 70 through a porous surface 91 or at the fluid entry port 72 in order to maintain the desired concentration of suspended solids as permeate is removed at outlet 88.

In an embodiment, the dynamic crossflow effect can be augmented by directing diluent across or adjacent to the exterior surfaces 84 of the dynamic filter element 82 using diluent supply manifold 92, in operative communication with the diluent supply 56 (FIG. 4). The diluent supply manifold 92 may be equipped with nozzles (not depicted) for directing streams of diluent onto the exterior surfaces 84 of the dynamic filter elements 82 and increasing the velocity of the diluent stream upon impact, if desired. In addition to supplying diluent, placing the diluent supply manifold in close proximity to the rotating filter elements 82, can induce turbulence at the surface of filter element 82 and promote clearing of the surface and openings of that element. The size and shape of the diluent manifold may be altered to fit the geometry of the filtration unit and provide complete coverage of the exterior surface 84 of the filter element 82.

In an embodiment, the dynamic filtration device is cylindrically shaped and has multiple diluent manifolds interleaved between multiple disk-shaped dynamic filter elements. In this embodiment, the diluent supply manifolds occupy a sector of the circular cross-section of the dynamic filtration device.

In an embodiment, the dynamic filtration device 58 is filled with the process slurry using pressure supplied to the process slurry supply vessel 54 (FIG. 4). Alternatively, the process slurry may be pumped into the dynamic filtration device 58 using low shear pumps, such as positive displacement pumps lacking valves. The rotatable filter assembly 76 is spun at a rate from about 10 rpm to about 1000 rpm, or from about 25 rpm to about 500 rpm, or from about 60 rpm to about 300 rpm while removing permeate and supplying make-up diluent as needed. Rotation of the rotatable filter assembly 76 generates or otherwise subjects the slurry to a tangential relative velocity from about 0.1 m/second to about 10.0 m/second or from about 0.2 m/second to about 2.0 in/second, or from about 0.5 m/second to about 1.8 m/second. The superficial velocity of the process slurry flowing through the dynamic filter element is from about 0.0002 m/second to about 0.002 in/second. The necessary pressure to cause passage of the process slurry (and fines) through the dynamic filter element 82 is supplied by the diluent which is constantly supplied under pressure to the dynamic filtration unit 58. Permeate containing fines and/or undersized particles are removed and diluent free of solids is restored to the dynamic filtration device 58 to maintain a relatively steady concentration of particles that are larger than the openings of the filter element 82. Fresh solids-free diluent can be made by external filtration of the permeate. The process is continued for a sufficient time to reduce the fines in the process slurry to the desired level.

The retentate may be then removed from the dynamic filtration device 58 by pressurization or via a gravity drain. The process may thereafter be repeated or the classified catalyst composition may be recovered from the retentate. Recovery of the classified catalyst composition from the dynamic filtration retentate may be accomplished by way of filtration and/or vacuum filtration. The recovered classified catalyst composition may be washed and dried as necessary as is known in the art. In an embodiment, the classified catalyst composition recovered from the dynamic filtration process has an F10.5 value less than 1 weight %, or from 0 weight % to less than 1 weight %, or from about 0.1 weight % less than 1 weight % (based on the weight of the classified catalyst composition) as determined by an Accusizer particle sizing instrument.

Alternatively, the dynamic filtration may be performed in a continuous manner by utilizing multiple dynamic filtration devices in series, or multiple, sequential filter assemblies in a single filtration unit. By causing the process slurry to pass across multiple dynamic filter devices, the final retentate can be discharged from the dynamic filtration system free of, or substantially free of, catalyst fines. Particles that are larger than the desired classification or size range may be removed by passing the process slurry through a first, large pore filter prior to entering the dynamic filtration system (prefiltration). Generally, large particles are not formed in a procatalyst composition because of the process used in its manufacture. In such a situation, prefiltration is usually not required. Suitably, the resulting classified catalyst composition also has an F10.5 value less than 1 weight %.

Other types of dynamic filtration systems are within the scope of this disclosure. For example, the dynamic filter device may include a plurality of disk-shaped dynamic filter elements closely spaced in a stacked configuration on a central hollow rotating support. The rotatable, stacked dynamic filter elements are interleaved with stationary dynamic filter elements extending inward from a manifold outside the disk stack or an interior surface of the housing. The rotating support is hollow to receive permeate that moves through the stationary dynamic filter elements. Other nonlimiting examples of suitable dynamic filtration systems are disclosed in U.S. Pat. Nos. 3,477,575; 6,106,713; and 6,117,322, the contents of each are incorporated by reference herein in their respective entireties. In a further embodiment, the dynamic filtration system is a Schenk™ ZEF Thickener, available from the Pall Corporation, Bad Kreuznach, Germany.

Figure 6:
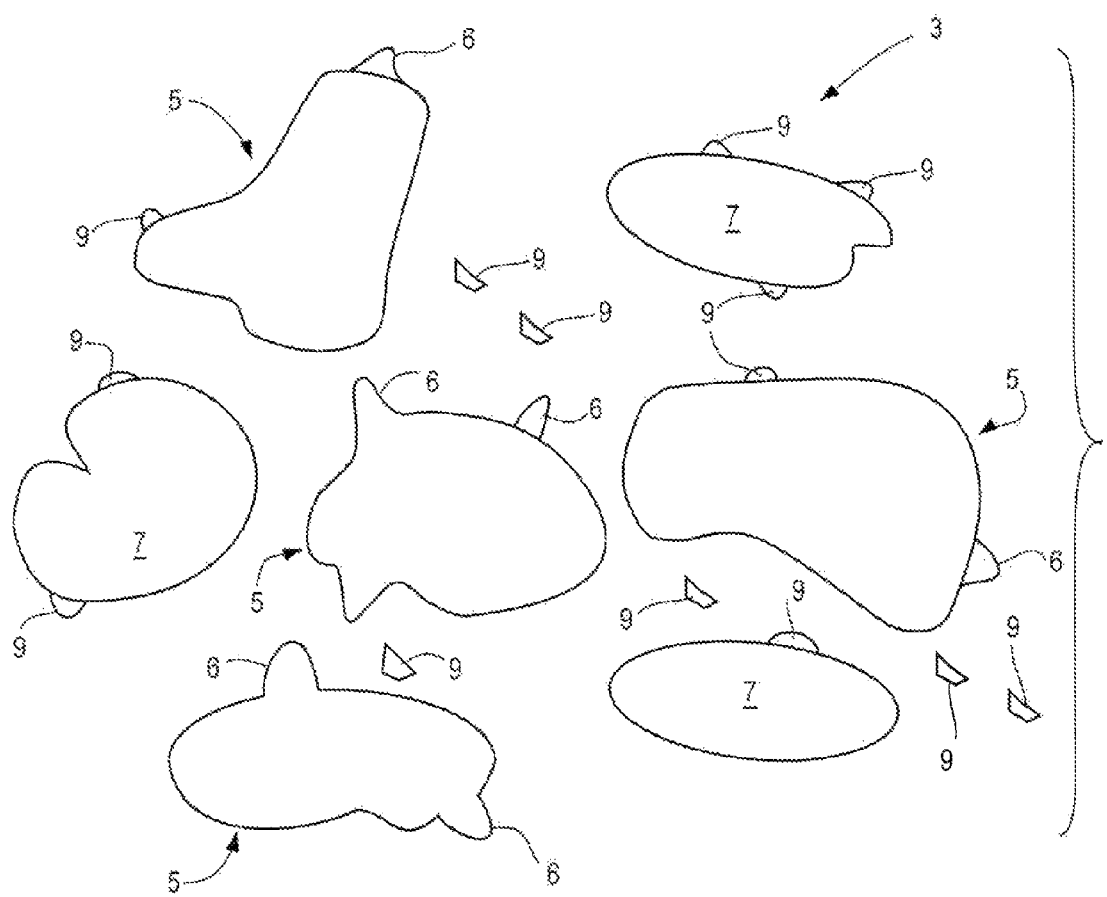
FIG. 6 is a schematic representation of a catalyst composition in accordance with an embodiment of the present disclosure.

In an embodiment, the present process includes polishing the catalyst particles. As used herein, "polishing" is the removal of catalyst fines and/or protuberances from the surface of the catalyst particles. FIG. 6 is a schematic representation of the catalyst composition before being subject to dynamic filtration. As shown in FIG. 6, the catalyst composition includes particles with protuberances (PWPs) 5, catalyst particles 7, and catalyst fines 9. Not wishing to be bound by any particular theory, it is believed that attractive forces, such as electrostatic forces, adhere the catalyst fines 9 to the surfaces of the catalyst particles 7. The strain between the catalyst particles 5,7 and the catalyst fines 9 imposed by the rotational force during dynamic filtration is greater than the attractive forces between the catalyst fines 9 and the catalyst particles 5,7. Consequently, subjecting the catalyst composition to dynamic filtration removes the catalyst fines 9 from the surfaces of the catalyst particles 5,7.

Figure 7:
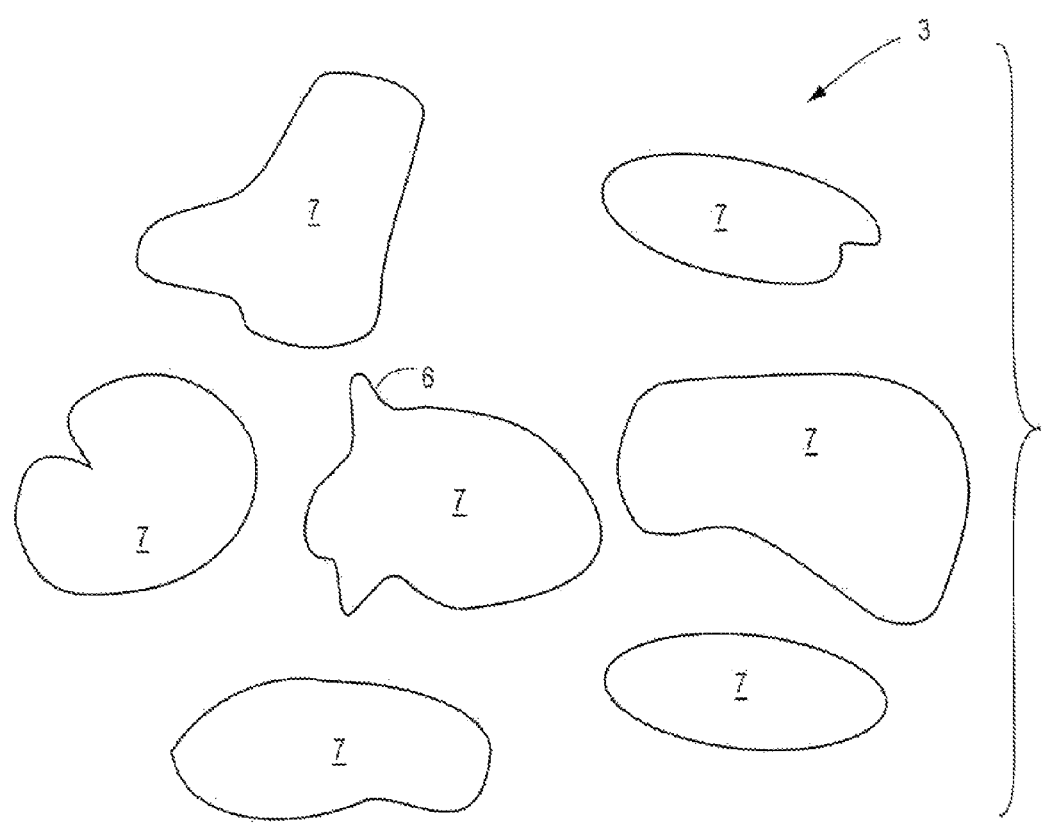
FIG. 7 is a schematic representation of a classified catalyst composition in accordance with an embodiment of the present disclosure.

The motion, turbulence and mixing associated with dynamic filtration also causes collisions between the PWPs 5, the catalyst particles 7, and the catalyst fines 9. The collisions remove the protuberances 6 from the PWPs 5, producing catalyst particles 7. Noteworthy is the smooth surface morphology of the catalyst particles 7 compared to the PWPs 5. FIG. 7 is a schematic representation of the catalyst composition after dynamic filtration. FIG. 7 illustrates that after dynamic filtration, the catalyst composition contains more catalyst particles 7, fewer PWPs 5 and no, or substantially no, catalyst fines 9.

In an embodiment, the present disclosure provides a polymerization process. The polymerization process includes classifying the slurry of the catalyst composition to form a retentate and recovering a classified catalyst composition from the retentate. The process further includes reacting the classified catalyst composition with an olefin and forming a polyolefin composition. The classified catalyst composition may be any classified catalyst composition as disclosed herein.

In an embodiment, the polymerization process is conducted in an apparatus which includes a crossflow classification device and a polymerization reactor. The crossflow classification device can be (i) in operative communication with, (ii) proximate to, or (iii) remote from, the polymerization reactor. The crossflow classification device is adapted to receive a slurry of a catalyst composition and retain a classified catalyst composition. The crossflow classification device is the crossflow filtration assembly or a dynamic filtration system as previously discussed herein. Contact between the classified catalyst composition and the olefin under the polymerization conditions provided by the polymerization reactor produces a polyolefin. The olefin may be any alkene having the formula $C_xH_{2x}$. For purposes of this disclosure, ethylene is considered an olefin. In an embodiment, the olefin is one or more $C_3$-$C_8$ alpha-olefin(s) and/or ethylene. In an embodiment, the polymerization reactor may be a fluidized bed polymerization reactor. Nonlimiting examples of suitable fluidized bed polymerization reactors (and suitable polymerization conditions) are disclosed in U.S. Pat. Nos. 4,302,565; 4,302,566; and 4,303,771; the content of each being incorporated herein by reference in its respective entirety.

In an embodiment, the polymerization process includes recovering (from the retentate) a classified catalyst composition having an F10.5 value less than 1 weight % (based on the classified catalyst composition weight) as discussed above. Classification may occur by subjecting the slurry of the catalyst composition to either crossflow filtration or dynamic filtration. In other words, classification may occur either by (i) passing the slurry along the crossflow filter element or (ii) moving the dynamic filter element with respect to the slurry as discussed above. Once recovered from the retentate, the classified catalyst composition may be combined with other optional components prior to or during introduction into the polymerization reactor to form a "polymerization catalyst." In an embodiment, the polymerization catalyst is the classified catalyst composition combined with one or more of the following: a cocatalyst, an external electron donor, and a selectivity control agent.

The co-catalyst may be chosen from any of the known activators of olefin polymerization catalyst systems employing a titanium halide, or an organoaluminum compound. Nonlimiting examples of suitable cocatalysts include trialkylaluminum compounds, alkylaluminum alkoxide compounds, including oligomeric or polymeric alumoxane or modified alumoxane modified by incorporation of one or more different trialkyl aluminum compounds, and alkylaluminum halide compounds. In an embodiment, the compounds of the foregoing list contain an alkyl group in which each alkyl group independently has from 1 to 6 carbon atoms. In a further embodiment, the cocatalyst is trialkylaluminum or a dialkylaluminumhalide compound, wherein each of the alkyl groups independently contain from 1 to 4 carbon atoms. In yet a further embodiment, the cocatalyst is triethylaluminum, triisopropylaluminum, triisobutylaluminum, diethylaluminum chloride, or mixtures thereof. The cocatalyst may be employed in a molar ratio of aluminum to titanium of the classified catalyst composition of from about 1:1 to about 500:1, or in a molar ratio of from about 10:1 to about 200:1.

A selectivity control agent (SCA) and/or an external electron donor may also be added to the classified catalyst composition. Suitable SCAs are those conventionally employed in conjunction with titanium-based Ziegler-Natta catalyst compositions. Illustrative of suitable selectivity control agents are $C_{1-4}$ alkyl ethers of monocarboxylic acid esters, such as p-ethoxyethyl benzoate (PEEB), as well as organosilane or polyorganosilane compounds containing at least one silicon-oxygen-carbon linkage. Suitable silicon compounds include those of the formula, $R'_mSiY_nX'_p$, or oligomeric or polymeric derivatives thereof, wherein: R' is a hydrocarbon radical containing from 3 to 20 carbon atoms, optionally containing heteroatoms and which may include bonding between the heteroatom and silicon. Y is —$OR_2$ or —$OCOR_2$ wherein $R_2$ is a hydrocarbon radical containing from 1 to 20 carbon atoms, optionally containing heteroatoms, X' is hydrogen or halogen, in is an integer having a value of from 0 to 3, n is an integer having a value of from 1 to 4, p is an integer having a value of from 0 to 1, or 0, and m+n+p=4. In an embodiment, R' in at least one occurrence is not a primary alkyl group, and the non-primary carbon or heteroatom thereof is attached directly to the silicon atom. Nonlimiting examples of R' include cyclopentyl, t-butyl, isopropyl or cyclohexyl. Examples of $R_2$ include methyl, ethyl, butyl, isopropyl, phenyl, benzyl and t-butyl. Examples of X' are Cl and H.

Each R' and $R_2$ may be the same or different, and, if a polyatomic radical, may be substituted with any substituent which is inert under the reaction conditions employed during polymerization. $R_2$ may contain from 1 to 10 carbon atoms when it is aliphatic and may be a sterically hindered aliphatic- or a cycloaliphatic-group. When $R_2$ is aromatic it may have from 6 to 10 carbon atoms. Silicon compounds in which two or more silicon atoms are linked to each other by an oxygen atom, such as, siloxanes or polysiloxanes, may also be employed, provided the requisite silicon-oxygen-carbon linkage is also present. In an embodiment, the selectivity control agents are alkyl esters of ring alkoxy-substituted aromatic carboxylic acids, especially ethyl p-ethoxybenzoate (PEEB) and mono and dialkoxysilanes, especially n-propyltrimethoxysilane, dicyclopentyldimethoxysilane or cyclohexylmethyldimethoxysilane. Mixtures of the foregoing SCA's may be employed as well. Generally, the selectivity control agent is added to an olefin polymerization mixture simultaneously or non-simultaneously with addition of the cocatalyst, and is employed in order to increase production of isotactic polymer.

The selectivity control agent may be provided in a quantity of from 0.01 mole to about 100 moles per mole of titanium in the classified catalyst composition, or from about 0.5 mole to about 60 mole per mole of titanium in the classified catalyst composition. The polymerization catalyst is produced by any suitable procedure of contacting the classified catalyst composition, the cocatalyst and one or more selectivity control agents. The polymerization catalyst components or combinations thereof may be pre-contacted prior to introduction into the polymerization reactor to form a pre-formed polymerization catalyst. Alternatively, the classified catalyst composition, the cocatalyst and/or one or more selectivity control agents may be contacted simultaneously upon contact with an olefin monomer. In an embodiment, the polymerization catalyst components are mixed in a suitable vessel and the pre-formed polymerization catalyst is introduced into the polymerization reactor when initiation of polymerization is desired. Alternatively, the polymerization catalyst components are introduced into the polymerization reactor and the catalyst is formed in situ. In a further embodiment, the polymerization catalyst components may be introduced into one polymerization reactor and/or a pre-polymerization reactor with one or more olefin monomers and subsequently contacted with additional olefin monomers, which may be the same or different from the olefin monomers used in the first polymerization or pre-polymerization. The subsequent polymerization may take place in the same or in a different polymerization reactor.

The polymerization catalyst may be used in slurry, liquid phase, gas phase or bulk, liquid monomer-type polymerization processes as are known in the art for polymerizing olefins, or in a combination of such processes. As used herein, "polymerization conditions" are conditions (temperature and pressure) and starting materials present in a polymerization reactor sufficient to yield olefin polymerization. In an embodiment, polymerization may be conducted in a fluidized bed polymerization reactor by continuously contacting an alpha-olefin having 3 to 8 carbon atoms, and/or ethylene, with the polymerization catalyst. Discrete portions of the polymerization catalyst may be continuously or semi-continuously fed to the reactor in catalytically effective amounts together with the alpha-olefin and any additional components. The reaction product, namely the polyolefin composition may be continuously or semi-continuously removed from the polymerization reactor. As stated herein, the polymerization conditions may be fluidized bed polymerization conditions. Nonlimiting examples of fluidized bed reactors suitable for providing polymerization conditions and/or continuously polymerizing alpha-olefins are disclosed in U.S. Pat. Nos. 4,302,565; 4,302,566; and 4,303,771; the contents of each being incorporated herein by reference in its respective entirety.

In the polymerization process, the catalyst composition is typically introduced into the polymerization reactor as a catalyst slurry. A "catalyst slurry" is a solids-in-liquid suspension of particles of a catalyst composition suspended in an oil. The catalyst composition particles can be unclassified catalyst particles or classified catalyst particles as discussed above. A nonlimiting example of an oil suitable for the catalyst slurry is mineral oil. The "solids content" of the catalyst slurry is the amount or weight percent of the catalyst composition present in the slurry and is based on the weight of the slurry. The solids content affects catalyst activity and the feed rates for the polymerization process. Thus, an accurate determination of the solids content is important for maximizing production efficiencies.

In an embodiment, the catalyst composition includes a wash liquid. The "wash liquid" is a liquid hydrocarbon used to wash the catalyst composition during catalyst synthesis. The wash liquid binds to the catalyst composition. It has been surprisingly discovered that the wash liquid migrates into the oil when the catalyst particles are added to the oil for slurry formation. This wash liquid becomes part of the liquid phase of the slurry. Correspondingly, the wash liquid is no longer part of the solid phase of the slurry.

Figure 8:
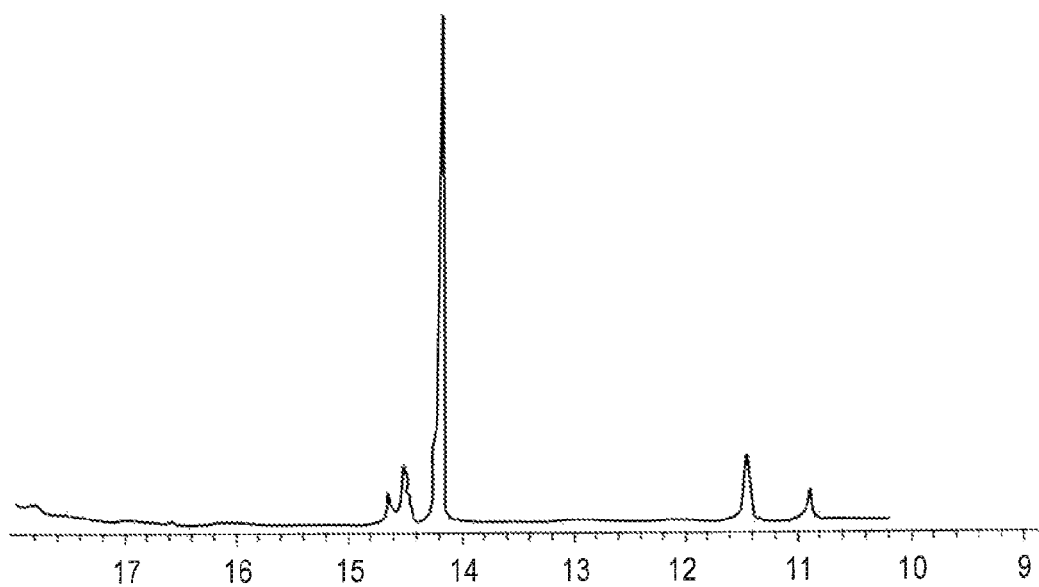
FIG. 8 is a $^{13}C$ NMR spectrum for a mineral oil in accordance with an embodiment of the present disclosure.
Figure 9:
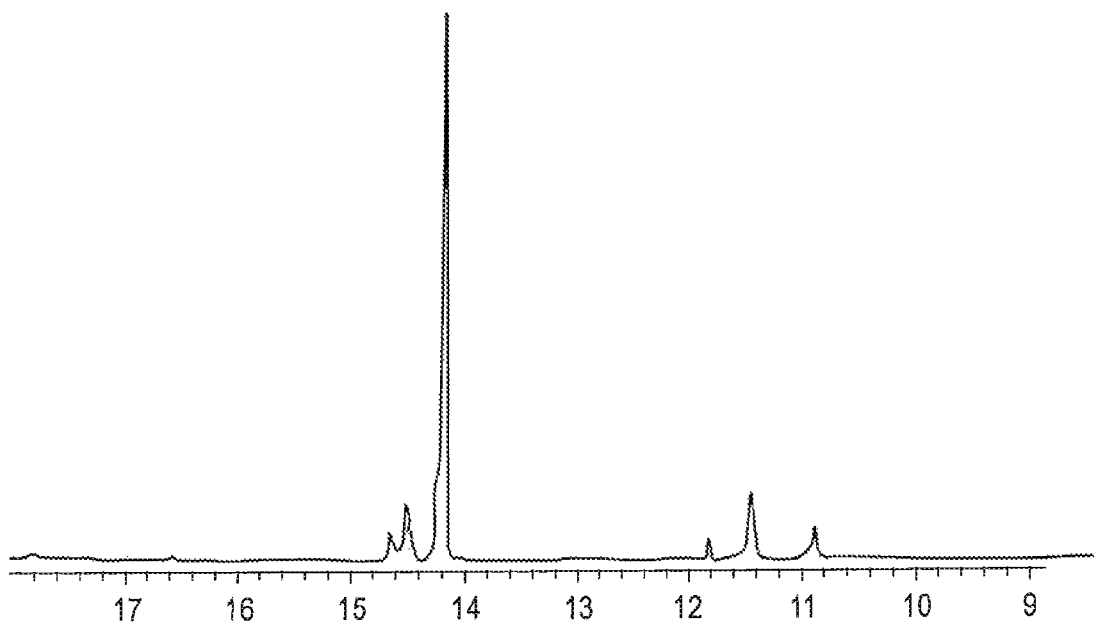
FIG. 9 is a $^{13}C$ NMR spectrum for a catalyst slurry in accordance with an embodiment of the present disclosure.

A comparison between FIG. 8 and FIG. 9 illustrates this phenomenon. FIG. 8 is a $^{13}$C NMR spectrum for 100% mineral oil sold under the trademark Hydrobrite® 380 available from Sonneborn, Inc., Tarrytown, N.Y., FIG. 9 is a $^{13}$C NMR spectrum for a catalyst slurry composed of a Ziegler-Natta catalyst composition suspended in Hydrobrite® 380 mineral oil. During catalyst synthesis, the catalyst composition is washed with a liquid hydrocarbon, such as isopentane. The $^{13}$C NMR spectrum for the catalyst slurry depicted in FIG. 9 exhibits a peak at 11.8 ppm. The peak at 11.8 ppm is due to the presence of isopentane. The $^{13}$C NMR spectrum for the mineral oil depicted in FIG. 8 lacks a peak at 11.8 ppm. Integration of the $^{13}$C NMR spectrum of FIG. 9 determines the presence of isopentane to be about 0.6 wt % of the liquid phase. Thus, NMR spectroscopy confirms migration of the wash liquid from the catalyst composition and into the mineral oil.

It has also been surprisingly discovered that some of the oil binds to the pores and surfaces of the catalyst particles. This catalyst-bound oil is removed from the liquid phase of the slurry. Conventional slurry solids content measurement techniques do not account for these phenomena. For example, inductively coupled plasma (ICP) spectroscopy of catalyst slurry is based on titanium detection as indicated below.

% solids=Ti powder)/(% Ti slurry)×100%.

Detection for titanium fails to account for the migration of wash liquid from the catalyst composition particles into the liquid phase. Consequently, conventional techniques for measuring catalyst slurry solids content are imprecise and carry a wide degree of error.

The polymerization process may comprise two or more embodiments disclosed herein.

An embodiment of the present disclosure provides an improved method for determining the solids content for slurries, and catalyst slurries in particular. The method measures the liquid weight percent of the catalyst slurry and applies a migration correction factor thereto. The catalyst slurry has an unknown weight percent of solids. A calculation using the liquid weight percent value and the migration correction factor yields a precise measurement of the slurry solids content.

The method includes preparing a migration correction factor for the catalyst composition. An NMR response signal is obtained for a catalyst slurry containing particles of the catalyst composition suspended in an oil. The method includes determining a liquid weight percent value for the catalyst slurry. The liquid weight percent value is determined from the NMR response signal of the catalyst slurry. The method further includes calculating a solids weight percent value for the catalyst slurry from the liquid weight percent value and the migration correction factor.

An NMR (nuclear magnetic resonance) analyzer is used to generate the NMR response signal for the catalyst slurry. The NMR analyzer detects the hydrogen present in the liquid phase of the catalyst slurry and produces an NMR response signal that is proportional to the number hydrogen atoms present in the liquid phase. The NMR response signal provides an accurate representation of the amount of hydrogen present in the liquid phase. In an embodiment, the NMR analyzer measures the free induction decay response of the hydrogen present in the liquid phase and produces the response signal therefrom.

From the NMR response signal, the NMR analyzer calculates the NMR liquid weight percent value for the slurry. Since the sum of the liquid wt %+solids wt %=100%, the solids weight percent of the catalyst slurry is a calculated as: 100%−liquid wt %=solids wt %. In an embodiment, the NMR analyzer is a Minispec MQ-20 benchtop pulsed proton nuclear magnetic resonance analyzer available from Bruker Optik GmbH Ettlingen, Germany. The solids weight percent value for the catalyst slurry is calculated from the liquid weight percent value and the migration correction factor as shown in equation (I) below.

$$\text{Solids wt \% value} = \text{migration correction factor} \times [100 - \text{liquid wt \% value}] \quad (I)$$

Although the present disclosure is directed to catalyst slurries, it is understood that any type of solid-in-liquid slurry is within the scope of the present disclosure. The present method is particularly suitable for slurries that exhibit liquid migration between the liquid phase and the solid phase.

The method includes preparing a migration correction factor for the catalyst slurry. As used herein, the "migration correction factor" is a numeric value which accounts for the movement of the wash liquid from the solid phase of the slurry and into the liquid phase of the slurry. The migration correction factor is the result of computations performed on measured values (i.e., weight measurements and/or NMR analysis) from the catalyst slurry and the components thereof. In an embodiment, the migration correction factor may be adjusted or otherwise computed to also account for the portion of the liquid phase that binds to the slurry solid phase.

In an embodiment, the wash liquid is isopentane. When the catalyst composition particles are added to the oil to form the slurry, the isopentane moves, migrates or otherwise travels from the catalyst composition particles and into the oil. The migration correction factor advantageously accounts for the addition of the wash liquid, isopentane, into the liquid phase of the slurry. Stated differently, the present method accounts for the departure of the wash liquid from the catalyst composition when determining the solids content of the catalyst slurry. Provision of the migration correction factor yields a precise determination of slurry solids content.

In an embodiment, the method includes preparing or otherwise computing the migration correction factor by forming a standard catalyst slurry and comparing (1) the solids content of the standard catalyst slurry to (2) the solids content of the standard catalyst slurry as measured by the NMR analyzer. As used herein, the "standard catalyst slurry" is a catalyst slurry with a known solids weight percent value for the catalyst composition suspended therein. The standard catalyst slurry is prepared by separately weighing the catalyst composition and separately weighing the oil. The individually pre-weighed components are then mixed together to make the standard catalyst slurry.

The NMR analyzer is used to generate an NMR response signal of the standard catalyst slurry and compute a measured solids weight percent value for the standard catalyst slurry. The "measured solids weight percent value" is the solids weight percent of the standard catalyst slurry as measured or otherwise detected by the NMR analyzer. Since the NMR analyzer measures the weight percent of the slurry liquid phase, the measured solids weight percent value accounts for the presence of the wash liquid in the liquid phase. The method further includes dividing the known solids weight percent value by the measured solids weight percent value to calculate or otherwise determine the migration correction factor as shown in equation (II) below.

$$\text{Migration correction factor} = \frac{\text{known solids wt \% (std cat slurry)}}{\textit{NMR}\text{-measured solids wt \% (std cat slurry)}} \quad (II)$$

In an embodiment, preparation of the migration factor further includes determining a wash liquid weight percent value for the catalyst composition. High resolution NMR spectroscopy and/or gas chromatography (GC) are/is used to determine the amount of wash liquid in the catalyst composition prior to slurry formation. For example, a known amount of catalyst composition can be diluted or dissolved in a solvent (such as chloroform or 2-methyl-ethanol) to form a GC sample. The GC sample can be injected into a gas chromatograph. The amount of wash liquid present in the sample can be determined via integration of the wash liquid peak. GC peak identification for the wash liquid can be determined via comparative analysis with a GC peak spectrum of the wash liquid of known weight and sample concentration.

The known solids weight percent value is adjusted by subtracting the wash liquid weight percent value from the known solids weight percent value as show in equation (III) below.

The known solids weight percent value is adjusted by subtracting the wash liquid weight percent value from the known solids weight percent value as shown in equation (III) below.

$$\text{Known solids wt \% A value} = \text{pre-weighed catalyst} \times [1 - (\text{wash liq wt \% value}/100)] \quad (III)$$

The known solids wt % value of equation (III) is then divided by the measured solids weight percent value as in equation (II) to provide the migration correction factor.

In an embodiment, the method includes providing or otherwise preparing a plurality of samples of the catalyst slurry. The catalyst slurry samples are prepared in respective individual NMR tubes. The method includes determining (by way of the NMR analyzer) the liquid weight percent value for each sample. The liquid weight percent value for each sample is multiplied by the migration correction factor as shown in equation (I) to calculate the solids weight percent for each sample. This yields a plurality of solids weight percent values for the catalyst slurry. The standard deviation for the plurality of solids weight percent values is calculated and is less than about 0.4%. Thus, the method includes calculating from the plurality of samples (by way of multiplication of each solids weight percent value with the migration correction factor) a solids weight percent value for the catalyst slurry having a standard deviation of less than about 0.4%. The present method advantageously provides a precise technique in which to determine the solids content of a catalyst slurry.

In an embodiment, the method includes calibrating the NMR analyzer. Calibration of the NMR analyzer includes analyzing a pre-weighed sample of 100% oil. The NMR analyzer is programmed to simulate samples with proportionately smaller percentages of liquid. For example, the mass of the 100% oil sample is divided by 0.90 and a measurement is taken to simulate a catalyst slurry sample having 90 wt % oil and 10 wt % catalyst composition, the mass of the 100% oil sample is divided by 0.80 and a measurement is taken to simulate a catalyst slurry having 80 wt % oil and 20 wt % catalyst composition, and so on. The calibrated NMR analyzer is then used to generate the NMR spectrum for the catalyst slurry.

Once the solids content of the catalyst slurry is determined, the desired amount of catalyst composition can be introduced into a gas-phase polymerization (also known as fluidized bed polymerization) reactor. During gas-phase polymerization, the fluidized bed may be operated using a recycle stream of unreacted monomer from the fluidized bed reactor whereby a portion of the recycle stream is condensed. Additionally, a liquid condensing agent may be included in the reaction mixture as well. The foregoing procedures are referred to as "condensing mode" or "super condensing mode" and are disclosed in U.S. Pat. Nos. 4,543,399 and 4,588,790; the contents of each being incorporated by reference herein in its respective entirety. Utilization of condensing mode or supercondensing mode has been found to lower the amount of xylene solubles in isotactic polypropylene and to improve overall catalyst performance.

The method for determining solids content may comprise two or more embodiments disclosed herein.

The polyolefin composition produced by the present polymerization process may be a homopolymer, a copolymer, a terpolymer, and the like. In an embodiment, the polyolefin composition is a polypropylene homopolymer having high stiffness, modulus and strength properties. Alternatively, the present polymerization process may produce copolymers including copolymers of ethylene and propylene such as ethylene/propylene copolymers and polypropylene impact copolymers including ethylene/propylene rubber modified polypropylene. It is understood that the present polymerization process may be used to perform suitable polymerization of homopolymers, copolymers, terpolymers, or other product using liquid, slurry or gas phase reaction conditions, using the guidelines provided herein.

The present polymerization process produces a polyolefin composition having a relatively high bulk density in quantities that reflect the relatively high productivity of the polymerization catalyst. For example, the polymerization process produces a polypropylene product with a polymer bulk density (Pbd) as determined by gravimetric analysis of at least 0.40 g/cm$^3$, or at least 0.45 g/cm$^3$. This degree of bulk density advantageously yields higher reactor capacity utilization and/or efficiency of operation.

In an embodiment, the present polymerization process produces a polyolefin composition having a xylene solubles content from 1 weight % to less than 5 weight %, or less than 4 weight %, or less than 3 weight %. In a further embodiment, the polyolefin composition contains reduced amounts of the catalyst residue. The polyolefin composition may have a titanium content of less than about $1 \times 10^{-3}$ weight %, or less than $1 \times 10^{-4}$ weight or less than $5 \times 10^{-5}$ weight %. Weight percent is based on the total weight of the polyolefin composition.

Use of the classified catalyst composition in the present polymerization process advantageously reduces the number of polymer fines in the polyolefin composition. As used herein, "a polymer fine" is a polymer particle having a maximum diameter less than 250 μm as measured using a Gradex 2000 automated particle size analyzer. In an embodiment, the polymerization process forms a polyolefin composition having an F250 value from about 0.1 weight % to about 2 weight %, or from about 0.5 weight % to about 1.5 weight % or about 1 weight %. As used herein, "an F250 value" is the weight percent of the particles of the polyolefin composition that are less than 250 μm in size based on the weight of polymer. The F250 value is determined with a Gradex 2000 automated particle size analyzer. Thus, provision of the classified catalyst composition in the polymerization process advantageously yields a polyolefin composition with greater uniformity due to reduction in polymer fines.

In a further embodiment, a catalyst composition is provided. The catalyst composition includes a plurality of classified catalyst composition particles. The classified catalyst composition has an F10.5 value less than about 1 weight % or from about 0.1 weight % to less than about 1 weight %. The classified catalyst composition particles form a polyolefin composition with an F250 value less than 2 weight %, or from about 0.1 weight % to 2.0 weight % when the classified catalyst composition is contacted with an olefin under polymerization conditions. In an embodiment, the classified catalyst composition contains titanium. In a further embodiment, the classified catalyst composition is a Ziegler-Natta catalyst.

In an embodiment, a process for producing the catalyst composition is provided. The process includes producing a plurality of individual batches of the catalyst composition. A variance value for a selected catalyst property is calculated using the plurality of individual batches as the data set. Non-limiting examples of catalyst properties for which a variance value may be calculated include weight percent titanium, weight percent internal electron donor, solids content, and any combination thereof.

The process includes mixing the plurality of individual batches together and forming a master batch. The master batch is divided into master sub-batches. A variance value for the same catalyst property is calculated for the master sub-batches. The process includes reducing the variance value in the plurality of master sub-batches.

The catalyst composition may be any catalyst composition used for the polymerization of olefins. In an embodiment, the catalyst composition is a Ziegler-Natta catalyst composition which may or may not include an external electron donor. In one embodiment, the Zeigler-Natta, catalyst composition may be produced by way of any procedure disclosed herein. In another embodiment, the catalyst composition is a slurry of a Ziegler-Natta catalyst composition.

Conventional catalyst production is a batch operation. Batches of catalyst composition exhibit inherent variability. For example, a first batch of a Ziegler-Natta catalyst composition may have a titanium weight percent substantially different than the titanium weight percent of one or more subsequent batches of the Ziegler-Natta catalyst composition produced with the same equipment and the same procedures. Sources of batch variance include variation in manufacturing as well as variation in the measurement of the final product.

Variance between batches of catalyst compositions can cause problems during polymerization. For example, upon the introduction of a new batch of catalyst composition into a reactor, the variance between the new batch and the previous batch (in weight percent titanium, for example) can be so significant as to cause reactor disruption. Reactor operators tend to over-compensate adjustment of production parameters in anticipation of the changes resulting from the introduction of a new batch into the reactor. Consequently, batch variance increases the risk of reactor downtime and increases labor costs for polymer production as the use of a catalyst composition with a high variance value requires greater effort and attendance of reactor personnel to ensure smooth operation and disruption avoidance.

Surprisingly and unexpectedly, it has been discovered that the present process for multi-batch mixing yields a reduction in variance between catalyst composition batches. In other words, the present process increases homogeneity between batches of catalyst composition.

The present process includes producing a plurality of individual batches of a catalyst composition. The variance value is calculated for a selected property of the catalyst composition. The standard deviation ($\sigma$) and/or the variance ($\sigma^2$) for the selected catalyst composition property may be calculated as is commonly known in the art. The number of batches constitutes the data set upon which the variance for the selected property is determined. For example, the titanium weight % for each batch may be measured, from which $\sigma$ and/or $\sigma^2$ may be calculated for the data set.

The present process includes mixing the individual batches together to form a master batch of the catalyst composition. The mixing occurs in a mixing device. The mixing continues until the master batch is a homogeneous blend of the individual batches. The master batch is then divided into master sub-batches. The process includes reducing the variance value of the catalyst composition property across the master sub-batch data set. The number of samples (i.e., the number of batches) in the batch data set and the master sub-batch data set may be the same or different.

Figure 10:
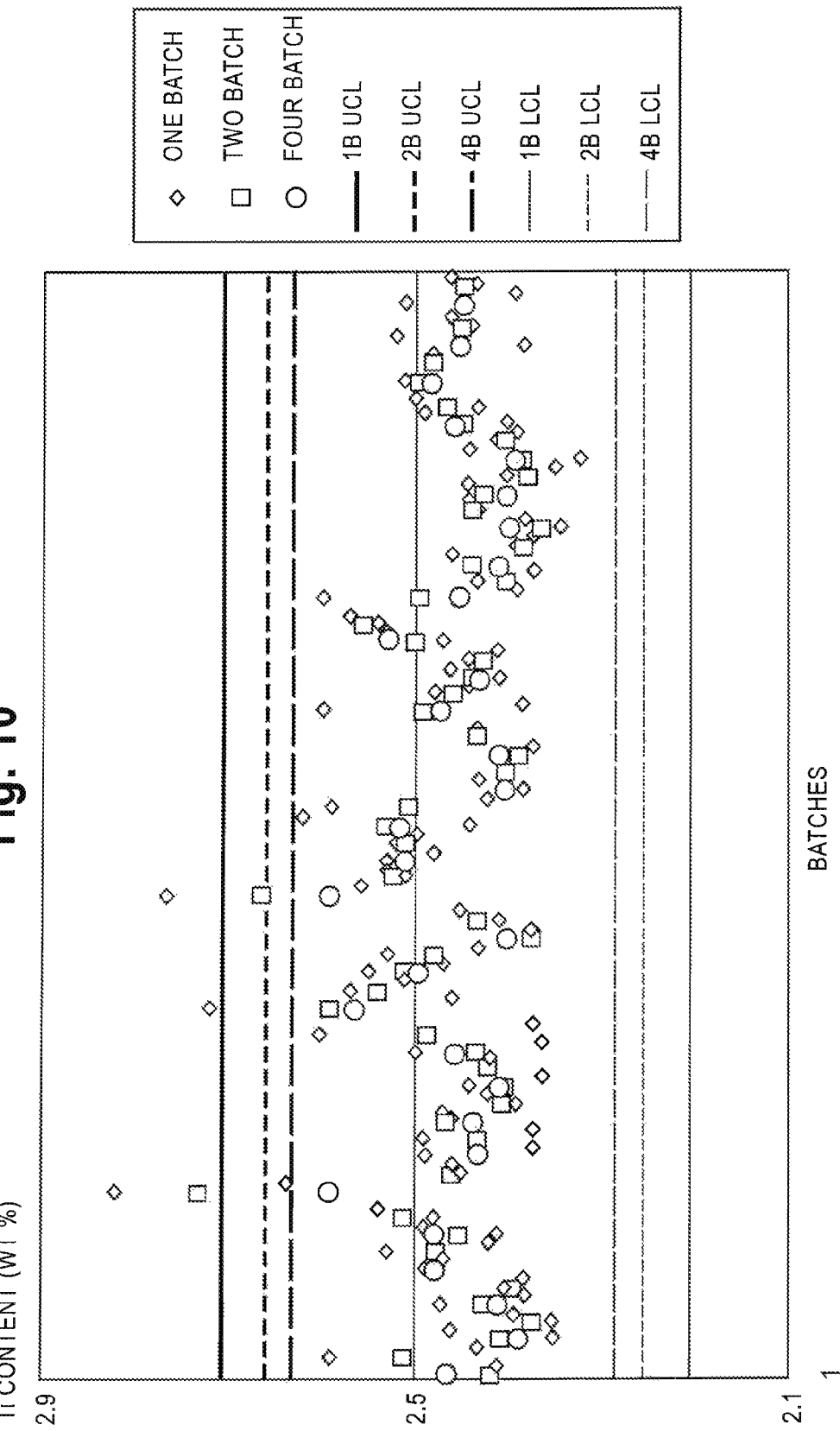
FIG. 10 is a graphical representation of a process for producing a catalyst composition in accordance with an embodiment of the present disclosure.

FIG. 10 provides a graph depiction illustrating how the number of individual batches used to make the master batch reduces the variance between batches of catalyst composition. The catalyst composition is a Ziegler-Natta catalyst composition. The selected catalyst composition property is titanium wt %. The upper control limit (UCL) and the lower control limit (LCL) for batches taken from 1-batch, 2-batch, and 4-batch mixtures are shown in FIG. 10. As can be seen from FIG. 10, the variance for 4-batch mixing is less than the variance for 2-batch mixing, which is less than no batch mixing. In other words, the control limits (for titanium content) for one batch are greater than the control limits for samples (batches) taken from a master batch made by mixing two individual batches, which are greater than the control limits for samples (batches) taken from a master batch made by mixing four individual batches.

Table 1 below illustrates how the number of individual batches mixed to make the master batch influences the reduction in variance. As the number of batches used to make the master batches increases, the variance decreases. This is evident in Table 1 whereby an increase in the number of individual batches results in an increase in a variability reduction factor. When four individual batches are mixed to form the master batch, the variability reduction factor is 2. In other words, the variance of master sub-batches from a four-batch master batch is half the variance of unmixed batches. Similarly, the variance of master sub-batches resulting from a 16-batch master batch show one fourth the variance of the unmixed batches (i.e., a variability reduction factor of 4).

TABLE 1

| Number of Batches Blended | Variability Reduction Factor | Percent of Original | Percent Reduction |
|---|---|---|---|
| 2 | 1.4 | 71% | 29% |
| 3 | 1.7 | 58% | 42% |
| 4 | 2.0 | 50% | 50% |
| 5 | 2.2 | 45% | 55% |
| 6 | 2.45 | 41% | 59% |
| 7 | 2.65 | 38% | 62% |
| 8 | 2.8 | 35% | 65% |
| 9 | 3.0 | 33% | 67% |
| 10 | 3.2 | 32% | 68% |
| 11 | 3.3 | 30% | 70% |
| 12 | 3.5 | 29% | 71% |
| 13 | 3.6 | 28% | 72% |
| 14 | 3.7 | 27% | 73% |
| 15 | 3.9 | 26% | 74% |
| 16 | 4.0 | 25% | 75% |

In an embodiment, the process includes mixing together at least four individual batches of the catalyst composition to form the master batch. This reduces the variance value for the selected catalyst composition property by a factor of at least 2 (i.e., the variance value of the master sub-batches is one-half the variance value of the unmixed individual batches).

In an embodiment, the process includes mixing together at least 12, or at least 16, individual batches of the catalyst composition to form the master batch. The process further includes reducing the variance value for the selected catalyst composition property of the batches by at least 4 (i.e., the variance value of the master sub-batches is one-fourth the variance value for the individual batches).

Figure 11:
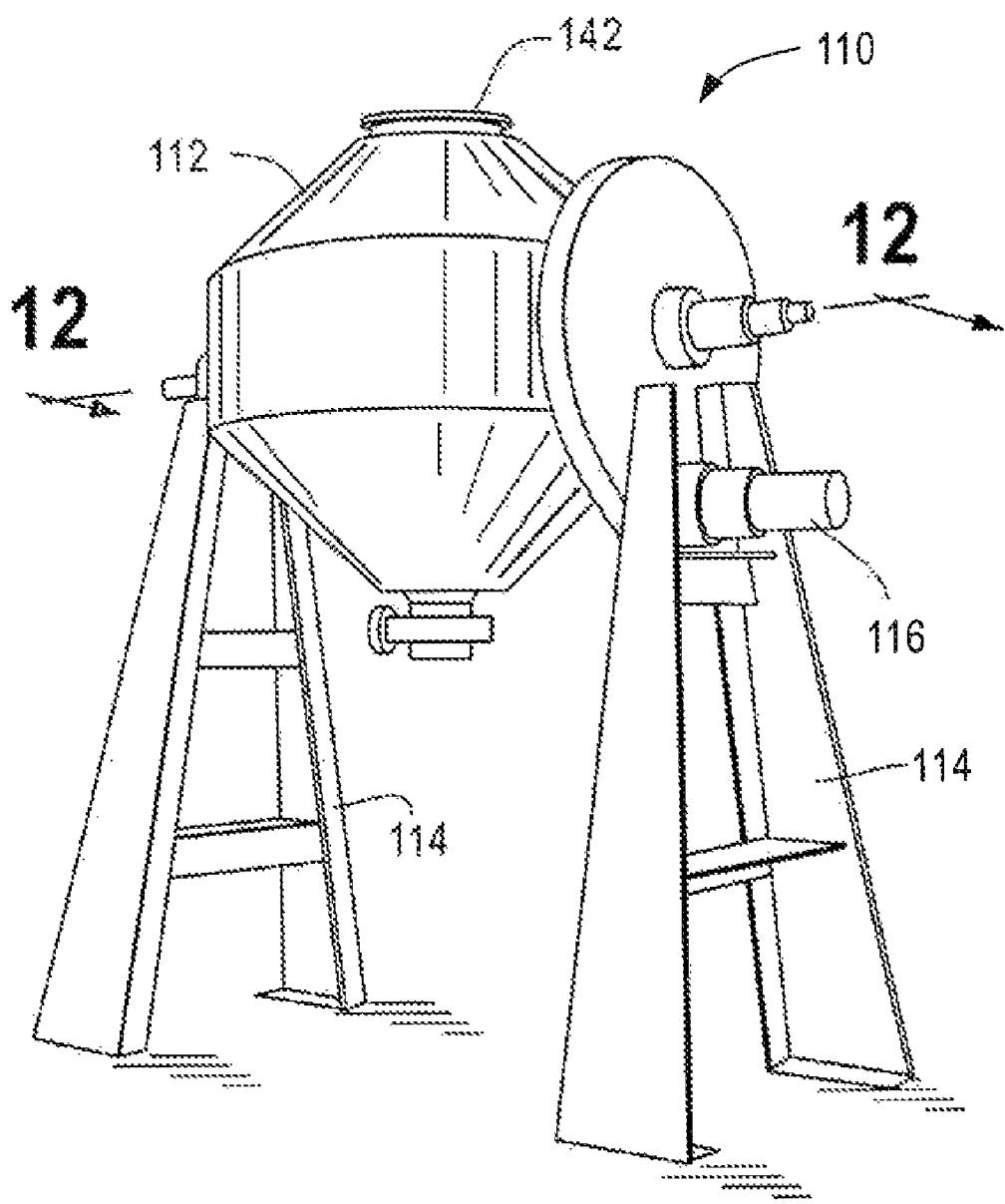
FIG. 11 is a perspective view of a mixing device in accordance with an embodiment of the present disclosure.
Figure 12:
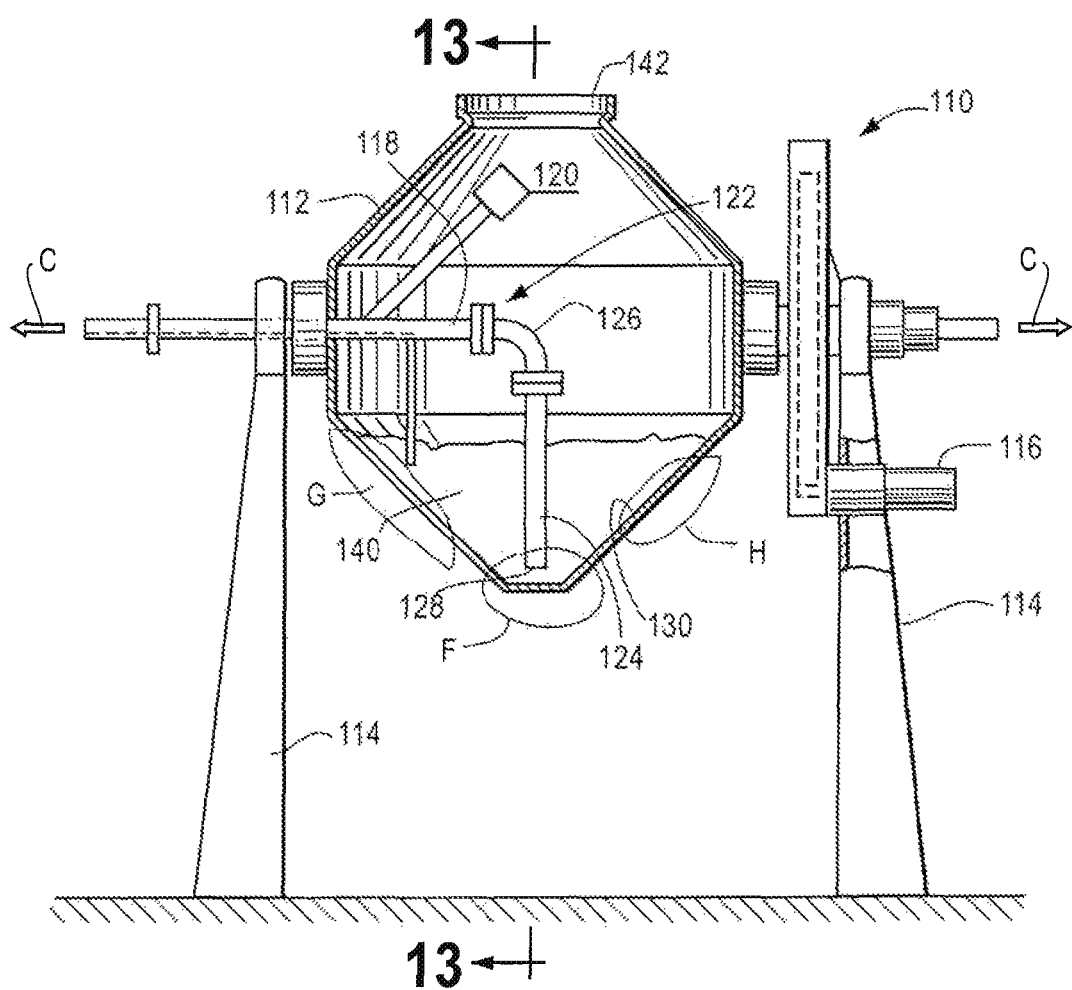
FIG. 12 is a sectional view of the taken along line 12-12 of FIG. 11.
Figure 13:
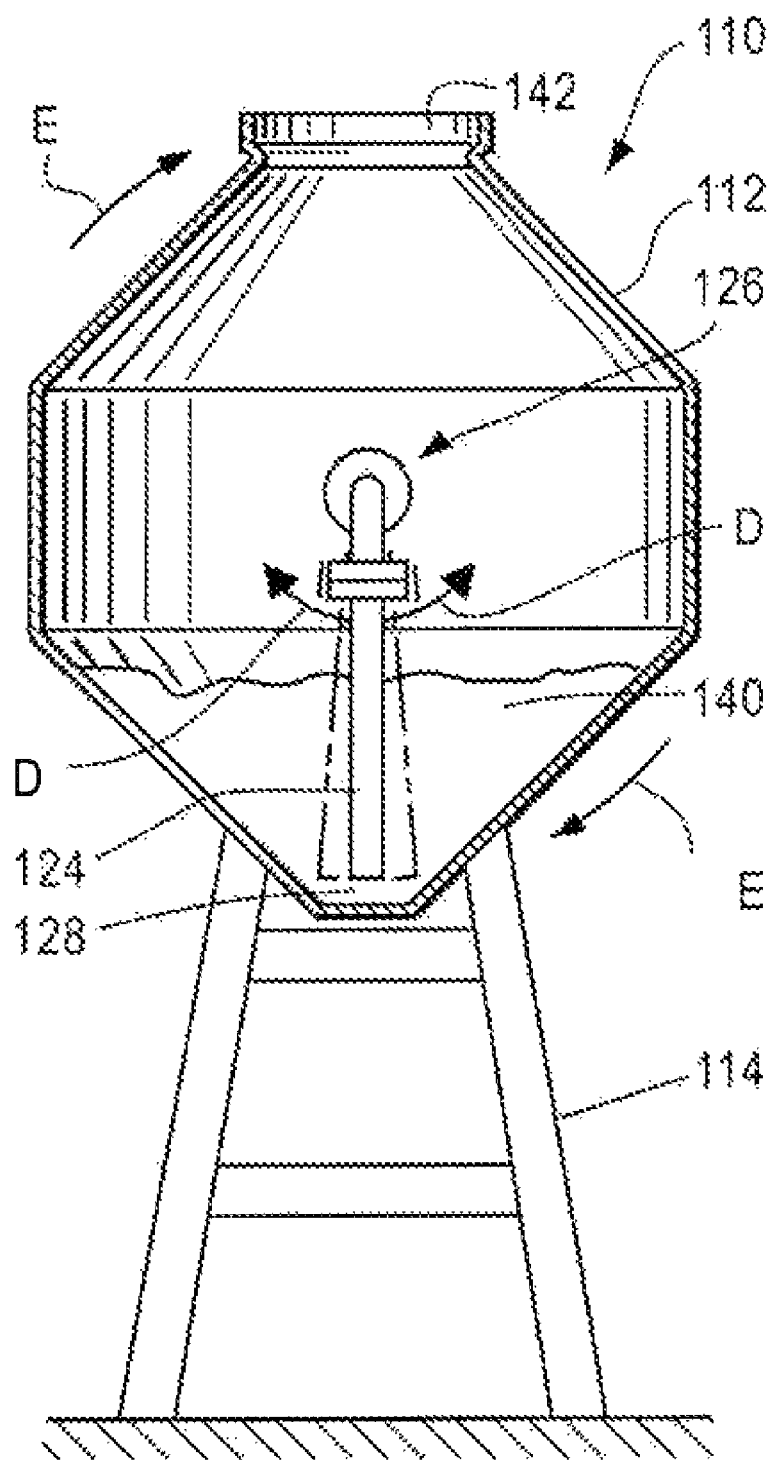
FIG. 13 is a sectional view taken along line 13-13 of FIG. 12.

In an embodiment, the mixing device is a rotatable mixing device 110 as shown in FIGS. 11-13. The mixing device 110 includes a chamber 112 rotatably attached to a support 114, and a drive device 116. A drive mechanism (not shown) operatively connects the drive device 116 with the chamber 112 permitting rotation of the chamber 112 along axis of rotation C (FIG. 12). A first annular member 118 extends through the support and into a chamber interior 120. An interior end 122 of the first annular member 118 is located in the interior of the chamber 112 as shown in FIG. 12.

The chamber 112 may have any cross-sectional shape as desired. Nonlimiting examples of suitable cross-sectional shapes for chamber 112 include cylindrical, spherical, elliptical, diamond-shaped, or dual-cone.

In an embodiment, the chamber 112 has a dual-cone cross-sectional shape as shown in FIGS. 11-13. The dual-cone mixing device gently mixes with an end-over-end action and alternately folds and spreads the contents of chamber 112 to provide low-shear mixing action. Chamber 112 includes an inner surface 130 which defines the chamber interior 120. Area F in FIG. 13 shows a portion of the inner surface 130 that is the furthermost inner surface from the axis of rotation C. Comparatively, Area G and Area H each denote inner surface portions that are not furthermost inner surfaces from the axis of rotation C.

A second annular member 124 is located in the chamber interior 120. The second annular member 124 is substantially perpendicular to, or perpendicular to, the first annular member 118. A rotatable annular joint member 126 operatively connects the interior end 122 with the second annular member 124. The rotatable annular joint member 126 permits the second annular member 124 to move or otherwise rotate with respect to the first annular member 118 as shown by arrow D in FIG. 13. The rotatable annular joint member 126 further permits the second annular member 124 to move (arrow D) as the chamber 112 rotates as shown by arrow E in FIG. 13.

In an embodiment, the second annular member 124 has a distal end 128. The distal end 128 is proximate to the inner surface portion furthermost from the axis of rotation C (i.e., Area F). In a further embodiment, the distance between the distal end 128 and the furthermost inner surface portion, Area F, is greater than 0 to about 100 cm, or from about 1 cm to about 50 cm, or from about 10 cm to about 50 cm.

The present mixing device 110 enables "sub-surface" filling and/or discharge of a catalyst composition or a catalyst slurry into/from the chamber 112. In an embodiment, the chamber 112 contains a liquid 140 into which a catalyst composition/slurry is introduced. The liquid may be water, alcohol, ether, a hydrocarbon, a chlorinated hydrocarbon, an oil, or any combination of the foregoing. In an embodiment, the catalyst slurry is a Ziegler-Natta catalyst composition suspended in an oil.

The term "sub-surface filling," as used herein, is the feeding of the catalyst composition (or catalyst slurry) into the interior of the chamber 112 without contact between the catalyst composition (or catalyst slurry) and the vapor space within the chamber 112. Sub-surface filling/discharge is safer than conventional filling/discharge procedures which expose the catalyst composition (or catalyst slurry) to the vapor space in the chamber 112. Many catalyst compositions, and Ziegler-Natta catalyst compositions in particular, are flammable. Reducing or eliminating contact between the catalyst composition and the chamber vapor space by way of sub-surface filling correspondingly reduces or eliminates the risk of ignition, explosion and/or degradation of the catalyst composition.

In an embodiment, the liquid 140 is introduced into the chamber 112 before introduction of the catalyst composition (or catalyst slurry) into the chamber 112. The liquid 140 may also be introduced simultaneously with the feed of the catalyst composition into the chamber 112. The liquid 140 may be introduced by way of the annular members (118, 126, 124) or by way of a feed hatch 142. The liquid 140 may or may not be the carrier liquid of the catalyst slurry.

In an embodiment, a process for sub-surface filling of a mixing device is provided using the mixing device 110. The process includes feeding the catalyst composition (or catalyst slurry) through the first annular member 118, through the rotatable annular joint member 126, through the second annular member 124, through the distal end 128 and into a liquid 140 that is present in the chamber interior 120. In this way, the catalyst composition (or catalyst slurry) avoids contact with the vapor space. In a further embodiment, the catalyst slurry is introduced under pressure into the chamber interior 120.

In an embodiment, the catalyst composition (or catalyst slurry) is fed into the chamber interior 120 through the first annular member 118, the rotatable annular joint member 126, and the second annular member 124. The liquid 140 is present in the chamber interior 120 and covers the distal end 128 of the second annular member 124. The catalyst composition (or catalyst slurry) enters the chamber interior through the distal end 128 and into the liquid 140. In this way, no contact occurs between the catalyst composition (or the catalyst slurry) and the vapor space in the chamber interior 120. By reducing, or wholly eliminating, contact between the catalyst composition and the chamber vapor space, the present mixing device 110 provides safer handling and mixing of the catalyst composition (or catalyst slurry) compared to conventional mixing devices that allow contact between the catalyst composition and the vapor space. The present sub-surface mixing process also improves catalyst longevity and shelf life by reducing catalyst degradation.

The contents of the mixing device 110 may be discharged through the annular members 118, 124, 126, with pressure.

The mixing device may include two or more embodiments disclosed herein.

The mixing device 110 may be used to mix individual batches of catalyst composition/catalyst slurry to produce one or more master batches of catalyst composition.

The process for producing the catalyst composition may comprise two or more embodiments disclosed herein.

By way of example and not limitation, examples of the present disclosure will now be given.

EXAMPLES

1. Classification

A series of magnesium-titanium (MagTi) based catalyst compositions are prepared using a procatalyst precursor comprising magnesium, titanium, alkoxide and halide moieties. The precursors are prepared by reacting magnesium diethoxide, titanium tetraethoxide, and titanium tetrachloride, in a mixture of orthocresol, ethanol and chlorobenzene at a temperature of about 75° C. for about 2 hours. The solid reaction product is precipitated by removing ethanol from the solution (by heating to about 90° C.), washing with hexane and drying the recovered solids. The resulting precursor composition is represented by the empirical formula: $Mg_3Ti(OC_2H_5)_8Cl_2$.

This precursor composition is converted to a procatalyst composition by contact with a 50/50 volume mixture of $TiCl_4$ and chlorobenzene. Approximately 3.0 grams of the precursor are added to a 150 ml flask. The mixture of $TiCl_4$ and chlorobenzene (60 ml) is added to the flask and stirred at 250 rpm. Diisobutylphthalate internal electron donor is added during the halogenation. The flask is heated using an electric heating mantle at the indicated heating rate under constant agitation. After reaching 115° C., stirring is maintained for approximately 1 hour. The resulting slurry is filtered through a fitted disc at the bottom of the flask.

The solid is then contacted twice more with 60 ml of the 50/50 volume mixture of $TiCl_4$ chlorobenzene and is heated to 115° C. for 30 minutes. The resulting solid particulated product is cooled to about 25° C., washed three times with 70 ml aliquots of isooctane, and dried in a stream of dry nitrogen for several hours.

A. Classification by Crossflow Filtration.

A crossflow filtration assembly as set forth in FIGS. 2 and 3 is used to classify a MagTi-based catalyst composition prepared as disclosed above. The crossflow filtration assembly is contained within a dry box under a nitrogen blanket. The crossflow filtration assembly includes a valveless piston pump. A slurry containing the MagTi-based catalyst composition in mineral oil is injected manually with a syringe into the assembly. The MagTi-based catalyst slurry circulates through the assembly for a short period of time, then the line is opened, and the needle valve on an isooctane diluent make-up is opened to keep the lines liquid full. The time is noted when the permeate collection begins. The permeate collection reservoir is placed on a scale, and the amount of process slurry (catalyst+mineral oil+diluent) recovered is noted along with the time at intervals during the experiment. Each crossflow filtration run uses a Fujiloy crossflow filter element (opening rated at 40 μm) from Fuji Filter Mfg. Co., Ltd, Tokyo Japan.

The crossflow filter device is drained and a retentate solution is collected into a bottle. The retentate solution is dilute, requiring a filtration step to collect the classified catalyst composition. The classified catalyst composition is isolated by vacuum filtration using a medium glass frit in a dry box. The classified catalyst composition is collected and dispersed in mineral oil. The catalyst particle size distribution is obtained with an Accusizer particle size analyzer.

Propylene is polymerized with the classified catalyst composition using C-donor (cyclohexyl methyl dimethoxysilane). The classified catalyst composition is premixed with TEAl (triethyl aluminum) and C-donor for 3 minutes prior to injection with a molar ratio of Al:Ti of 200:1 and a molar ratio of C-donor:Ti of 62.5. The premixed catalyst components are injected into an autoclave charged with 1375 g of propylene at 25° C., followed by a $H_2$ charge of 3,000 sec. The contents of the autoclave are maintained at 25° C. for 15 minutes, then ramped to 65° C. and held at this temperature for about an hour before quenching the reaction by venting the contents of the autoclave. Polymer fines measurements are made with a PSD (Gradex 2000).

The crossflow filtration results are set forth at Table 2 below.

TABLE 2

| Run Number | Average Permeate Flow Rate (g/min) | Catalyst Retentate F10.5 (vol %) | Catalyst Retentate D50 (μm) | F250 (wt %) |
|---|---|---|---|---|
| 1 | 40 | 2.98 | 50.3 | 1.0 |
| 2 | 24 | 2.71 | 47.5 | 0.9 |
| 3 | 6 | 2.61 | 55.1 | 0.9 |

B. Classification by Dynamic Filtration

A dynamic filtration assembly as set forth in FIGS. 4 and 5 is used to classify MagTi-based catalyst compositions prepared as disclosed above. Sample MagTi-based catalyst compositions are classified in an inert atmosphere using a Schenk ZEF dynamic filtration unit (thickening configuration) available from Pall Corporation, Bad Kreuznach, Germany. The Schenk ZEF dynamic filtration unit has a total filtration surface area of 0.3 m².

The dynamic filter elements are selected from the following.

Etched nickel screens, 40 μm×450 μm openings, 20% open area; and

Durafil™ screens, 60 μm wide elongated openings.

The process slurry is charged in the form of a catalyst slurry under pressure to the dynamic filtration device, which is pre-loaded with diluent liquid. The classified catalyst composition is removed by gravity drain, concentrated by evaporating diluent, then collected and dispersed in mineral oil. Catalyst particle size distribution is obtained with an Accusizer particle size analyzer.

Propylene is polymerized with the classified catalyst composition using C-donor (cyclohexyl methyl dimethoxysilane). The classified catalyst composition is premixed with TEAl (triethyl aluminum) and C-donor for 3 minutes prior to injection with a molar ratio of Al:Ti of 200:1 and a molar ratio of C-donor:Ti of 62.5. The premixed catalyst components are injected into an autoclave charged with 1375 g of propylene at 25° C., followed by a $H_2$ charge of 3,000 sec. The contents of the autoclave are maintained at 25° C. for 15 minutes, then ramped to 65° C. and held at this temperature before quenching the reaction by venting the contents of the autoclave. Polymer fine measurements are made with a PSD (Gradex 2000).

The dynamic filtration results are set forth below at Tables 3-1, 3-2, and 3-3.

TABLE 3-1

| Dynamic filtration of a MagTi-based catalyst | | | | | | | | |
|---|---|---|---|---|---|---|---|---|
| Run No. | Filter rotation speed (rpm) | Screen Type (μm) | Loading weight (kg) | Processing Time (min) | Slurry solids content (wt %) | Catalyst D50 (μm) | F10.5 (wt %) | F250 (wt %) |
| Control | | | | | | 44.35 | 1.07 | 3.70 |
| 10 | | | 4.500 | | | 43.73 | 0.18 | 0.60 |
| 11 | 300 | Durafil 60 | 3.000 | 90 | | 44.34 | 0.49 | 0.76 |
| 12 | | Durafil 60 | 2.000 | 180 | 31.0 | 44.76 | 0.18 | 0.70 |
| 13 | | Ni 40 × 450 | 2.000 | 300 | 36.0 | 42.38 | 0.04 | 0.70 |
| 14 | 180-210 | Ni 40 × 450 | 4.000 | 60 | 10.0 | 43.90 | 0.63 | 0.90 |
| 15 | 300 | Ni 40 × 450 | 2.400 | 135 | 19.2 | 44.07 | 0.10 | 1.10 |
| 16 | 300, 180, 150 | Ni 40 × 450 | 2.450 | 120 | 20.4 | 43.35 | 0.79 | 1.00 |
| 17 | 300, 180 | Ni 40 × 450 | 2.400 | 150 | 21.3 | 44.39 | 0.05 | 1.20 |
| 18 | 300 | Ni 40 × 450 | 2.400 | 150 | 20.0 | 44.38 | 0.03 | 0.80 |
| 19 | 300, 180, 150 | Ni 40 × 450 | 2.400 | 150 | 21.0 | 44.28 | 0.08 | 1.00 | diluent liquid = isooctane
*diluent liquid = isopentane

TABLE 3-2

Dynamic filtration of a MagTi-based catalyst

| Run No. | Filter rotation speed (rpm) | Screen type (μm) | Loading weight (kg) | Processing Time (min) | Slurry solids content (wt %) | Catalyst D50 (μm) | F10.5 (wt %) | F250 (wt %) |
|---|---|---|---|---|---|---|---|---|
| Control 20 | 300 | Ni 40 × 450 | 2.400 | 120 | 23.5 | 43.42 42.76 | 0.37 0.10 | 0.90 |
| 21 | 300 | Ni 40 × 450 | 2.400 | 60 | 24.1 | 42.72 | 0.09 | 0.50 |
| Control 22 | 120, 90 | Ni 40 × 450 | 2.370 | 120 | 21.1 | 43.27 43.39 | 0.38 0.10 | 1.00 |
| Control 23 | 90 | Ni 40 × 450 | 2.464 | 120 | 24.3 | 43.49 43.35 | 0.16 0.03 | 0.80 |
| 24 | 90, 60 | Ni 40 × 450 | 2.392 | 90 | 23.7 | 43.69 | 0.03 | 1.0/0.4 |
| 25 | 90, 60 | Ni 40 × 450 | 2.382 | 60 | 23.1 | 43.64 | 0.05 | 1.0/0.6 |
| 26 | 90, 60 | Ni 40 × 450 | 2.380 | 60 | 22.5 | 43.59 | 0.03 | 0.8/0.7 |
| Control 27 | 90, 60 | Ni 40 × 450 | 2.340 | 90 | 21.5 | 43.48 43.34 | 0.20 0.04 | 0.70 |
| 28 | 90, 60 | Ni 40 × 450 | 2.432 | 90 | 22.2 | 43.72 | 0.01 | 0.90 |
| 29 | 90, 60 | Ni 40 × 450 | 2.392 | 90 | 22.5 | 43.54 | 0.05 | 0.8/0.9 | diluent liquid - isooctane

TABLE 3-3

Dynamic filtration of a MagTi-based catalyst

| Run No. | Filter rotation speed (rpm) | Screen Type (μm) | Loading weight (kg) | Processing Time (min) | Slurry solids content (wt %) | Catalyst D50 (μm) | F10.5 (wt %) | F250 (wt %) |
|---|---|---|---|---|---|---|---|---|
| Control | | | | | | 27.50 | 0.17 | |
| 30 | 150, 90, 60 | Ni 30x | 2.434 | 90 | | 26.62 | 0.06 | |
| 31 | 90, 60 | Ni 30x | 2.480 | 90 | | 26.81 | 0.07 | |
| 32 | 90, 60 | Ni 30x | 4.804 | 120 | | 26.45 | 0.09 | | diluent liquid = isopentane

Catalyst Slurry Solids Content Determination,

A. Calibration.

A Minispec MQ-20 bench-top pulsed proton NMR analyzer with a PA236 probe (available from Bruker Optics, the Woodlands, Tex.) (hereinafter the "NMR analyzer") is calibrated as follows. A pre-weighed NMR tube containing 100% Hydrobrite® 380 mineral oil is placed into a heating block. The sample is measured seven times with a different weight for each measurement entered to mimic a sample containing a proportionately smaller percentage of liquid as shown in Table 4-1 below.

TABLE 4-1

| Sample ID No. | Sample Mass (g) | Calibration Standard (% liquid) |
|---|---|---|
| 1 | 2.5077 | 100 |
| 2 | 2.7863 | 90 |
| 3 | 3.1346 | 80 |
| 4 | 3.5824 | 70 |
| 5 | 4.1795 | 60 |

TABLE 4-1-continued

| Sample ID No. | Sample Mass (g) | Calibration Standard (% liquid) |
|---|---|---|
| 6 | 5.0154 | 50 |
| 7 | 12.5385 | 20 |

B. Standard Catalyst Slurry.

A catalyst slurry with a known solids content of 40.264 wt % is prepared by separately weighing a catalyst and Hydrobrite® 380 mineral oil on a Mettler AE200S analytical balance available from Mettler Instrument Corp., Highstown, N.J. The pre-weighed MagTi-based catalyst and the mineral oil are mixed to form a standard catalyst slurry. The MagTi-based catalyst composition has 1.44 wt % (based on the catalyst composition) of isopentane. The wt % of isopentane for the catalyst composition is determined by gas chromatography. The known solids weight percent for the standard catalyst slurry is determined by the following equation.

Known solids wt % = [wt % of (catalyst + wash liquid)] × [1 − (wt % wash liq/100)]

$$= 40.264\% \times [1 - (1.44/100)]$$

$$= 39.684\%$$

An NMR sample tube of the standard catalyst slurry is placed in the NMR analyzer and an NMR spectrum is generated from which the measured NMR liquid wt % for the standard catalyst slurry is calculated to be 58,481%. The measured solids weight percent value for the standard catalyst slurry is determined by the following equation.

$NMR$ measured solids wt % = 100% − 58.481 liquid wt %

$$= 41.519\%$$

C. Migration Correction Factor.

The (1) known solids wt % value and (2) the NMR measured solids wt % value for the standard catalyst slurry are used to calculate the migration correction factor by the following equation.

Migration correction factor = known solids wt % / measured solids wt %

$$= 39.684 / 41.519$$

$$= 0.9558$$

D. Solids Wt % for Catalyst Slurry with Unknown Solids Content.

In a glove box, catalyst slurry samples of a MagTi-based catalyst in Hydrobrite® 380 mineral oil with an unknown solids content are placed on a rotisserie mixer and mixed "end-over-end" for at least 15 minutes at 40° C. to ensure homogeneity. NMR tubes are weighed and a pipette is used to transfer the slurry to the NMR tubes. The slurry-filled NMR tubes are each weighed. The NMR tubes are capped and heated at 40° C. for at least 35 minutes. The NMR tubes are individually placed in the NMR analyzer whereby the NMR analyzer calculates the liquid weight percent of each sample. The NMR analyzer calculates the liquid weight percent for a sample to be 56.13%. The migration correction factor is used to calculate the solids wt % for the catalyst slurry with unknown solids content by the following equation.

Solids wt % (unknown) = migration correction factor ×

(100-liquid wt %)

$$= 0.9558 \times (100 - 56.13\%)$$

$$= 41.93\%$$

The solids wt % for multiple samples of the catalyst slurry with unknown solids content are calculated as described above. The standard deviation for the multiple samples is 0.4%.

It should be understood that various changes and modifications to the presently preferred embodiments described herein will be apparent to those skilled in the art. Such changes and modifications can be made without departing from the spirit and scope of the present disclosure and without diminishing its intended advantages. It is therefore intended that such changes and modifications be covered by the appended claim.

What is claimed is:

1. A process for producing a classified catalyst composition comprising:
   introducing a slurry composed of a catalyst composition comprising catalyst particles and catalyst fines into a crossflow classification device;
   removing the catalyst fines from the slurry to form a retentate; and
   recovering, from the retentate, a classified catalyst composition.

2. The process of claim 1 comprising recovering a classified catalyst composition having an F10.5 value less than 1 weight %.

3. The process of claim 1 wherein the catalyst composition has an F10.5 value greater than 1 weight %, the process comprising recovering a classified catalyst composition having an F10.5 value from about 0.1 weight % to less than 1 weight %.

4. The process of claim 1 comprising polishing the catalyst particles.

5. The process of claim 1 comprising a crossflow filter device with a crossflow filter element, the process comprising moving the slurry at a tangential velocity from 0.2 m/second to 2.0 m/second along the crossflow filter element.

6. The process of claim 1 comprising a crossflow filter device with a crossflow filter element, the process comprising passing the slurry through a valveless pump.

7. The process of claim 1 comprising a crossflow filter device having a crossflow filter element, the process comprising passing the catalyst fines through the crossflow filter element.

8. The process of claim 1 comprising a dynamic filter device having a dynamic filter element, the process comprising moving the dynamic filter element; and generating a relative tangential velocity from about 0.1 m/second to 10.0 m/second between the dynamic filter element and the slurry.

9. The process of claim 1 comprising a dynamic filter device having a dynamic filter element, the process comprising passing catalyst fines through the dynamic filter element.

10. A polymerization process comprising:
    crossflow classifying a slurry of a catalyst composition to form a retentate;
    recovering a classified catalyst composition from the retentate;
    contacting the classified catalyst composition with an olefin under polymerization conditions; and
    forming a polyolefin composition.

11. The polymerization process of claim 10 comprising recovering a classified catalyst composition having an F10.5 value less than 1 weight %.

12. The polymerization process of claim 10 comprising combining the classified catalyst composition with a member selected from the group consisting of a cocatalyst, a selectivity control agent, and combinations thereof.

13. The polymerization process of claim 10 comprising forming a polyolefin composition having an F250 value from about 0.1 weight % to about 2 weight %.

14. The polymerization process of claim 10 comprising subjecting the slurry to crossflow filtration.

15. The polymerization process of claim 10 comprising subjecting the slurry to dynamic filtration.

16. An apparatus comprising:
   a crossflow classification device adapted to receive a slurry of a catalyst composition and retain a classified catalyst composition; and
   a polymerization reactor adapted to receive the classified catalyst composition and an olefin and form a polyolefin.

17. The apparatus of claim 16 wherein the crossflow classification device is selected from the group consisting of a dynamic filtration device and a crossflow filtration device.

18. The apparatus of claim 16 comprising a dynamic filtration device having a dynamic filter element selected from the group consisting of a rotating dynamic filter element, an oscillating dynamic filter element, and a reciprocating dynamic filter element.

19. The apparatus of claim 16 wherein the polymerization reactor is a fluidized bed polymerization reactor.

20. The apparatus of claim 16 wherein the catalyst composition is selected from the group consisting of a Ziegler-Natta catalyst composition, a constrained-geometry catalyst composition, a metallocene catalyst composition, and combinations thereof.

* * * * *